United States Patent
Kumar

(10) Patent No.: US 10,178,045 B2
(45) Date of Patent: Jan. 8, 2019

(54) DYNAMIC DISCOVERY AND MANAGEMENT OF MICROSERVICES FOR MULTI-CLUSTER COMPUTING PLATFORMS

(71) Applicant: SAP SE, Walldorf (DE)

(72) Inventor: Dinesh Kumar, Calicut (IN)

(73) Assignee: SAP SE, Walldorf (DE)

( * ) Notice: Subject to any disclaimer, the term of this patent is extended or adjusted under 35 U.S.C. 154(b) by 45 days.

(21) Appl. No.: 15/258,272

(22) Filed: Sep. 7, 2016

(65) Prior Publication Data

US 2018/0069806 A1    Mar. 8, 2018

(51) Int. Cl.
*H04L 12/911*     (2013.01)

(52) U.S. Cl.
CPC .......... *H04L 47/826* (2013.01); *H04L 47/782* (2013.01); *H04L 47/827* (2013.01); *H04L 47/829* (2013.01)

(58) Field of Classification Search
CPC .......... G06F 9/5083; G06F 2009/4557; G06F 9/45558; G06F 9/5072; G06F 9/5077; G06F 9/5038; G06F 9/5088; G06F 11/1402; G06F 11/1425; G06F 11/1484; G06F 11/203; G06F 11/2035; G06F 11/2041; G06F 11/2048; G06F 11/3433; G06F 17/30215; G06F 2009/45562; G06F 2009/45595; G06F 9/45533; G06F 9/4856; G06F 9/5027; G06F 9/505; G06F 9/542; H04L 67/1031; H04L 41/0893; H04L 43/0876; H04L 67/10; H04L 67/1076; H04L 41/5019; H04L 43/04; H04L 47/125; H04L 47/70; H04L 47/78; H04L 47/781; H04L 67/1004; H04L 67/101; H04L 67/1012; H04L 67/1025; H04L 67/1095; H04L 67/1097
See application file for complete search history.

(56) References Cited

U.S. PATENT DOCUMENTS

| | | | | |
|---|---|---|---|---|
| 8,667,500 | B1 * | 3/2014 | Ji | G06F 9/5077 718/102 |
| 8,869,162 | B2 * | 10/2014 | Baynast | G06F 9/5027 718/104 |
| 9,195,484 | B1 * | 11/2015 | Ward, Jr. | G06F 9/455 |
| 9,495,477 | B1 * | 11/2016 | Dehnert | G06F 17/30958 |
| 9,672,122 | B1 * | 6/2017 | Gandhi | G06F 11/1425 |
| 9,716,617 | B1 * | 7/2017 | Ahuja | H04L 67/1031 |
| 9,720,732 | B1 * | 8/2017 | Shih | G06F 9/4887 |

(Continued)

*Primary Examiner* — Greg C Bengzon
(74) *Attorney, Agent, or Firm* — Jones Day

(57) ABSTRACT

Computer-implemented systems and methods for processing a request from a client are provided. A request for a computer-implemented process to be performed is received from a client. A group of computer resources responsible for performing the computer-implemented process is identified. Dependency information indicating dependency relationships between pairs of computer resources of the identified group is determined. For pairs of computer resources determined to have a dependency relationship, a cost incurred when a first computer resource of the pair invokes a second computer resource of the pair is determined at multiple points in time. It is determined whether to add, remove, or migrate additional computer resources to the group based on the cost information.

18 Claims, 17 Drawing Sheets

(56) References Cited

U.S. PATENT DOCUMENTS

| | | | |
|---|---|---|---|
| 9,774,698 B2* | 9/2017 | Farrell | H04L 67/32 |
| 9,798,596 B2* | 10/2017 | Vibhor | G06F 11/0709 |
| 9,838,332 B1* | 12/2017 | Smith | H04L 47/78 |
| 9,848,041 B2* | 12/2017 | Einkauf | H04L 67/1076 |
| 9,880,880 B2* | 1/2018 | Taylor | G06F 9/505 |
| 9,883,006 B2* | 1/2018 | Farrell | H04L 67/32 |
| 9,998,955 B1* | 6/2018 | MacCarthaigh | H04W 28/12 |
| 2007/0112574 A1* | 5/2007 | Greene | G06F 9/5072 340/572.1 |
| 2008/0008090 A1* | 1/2008 | Gilfix | H04L 47/15 370/230 |
| 2008/0056291 A1* | 3/2008 | Liu | G06F 9/5066 370/431 |
| 2009/0083390 A1* | 3/2009 | Abu-Ghazaleh | G06F 15/16 709/209 |
| 2011/0078303 A1* | 3/2011 | Li | G06F 9/505 709/224 |
| 2011/0161491 A1* | 6/2011 | Sekiguchi | G06F 9/4856 709/224 |
| 2012/0005236 A1* | 1/2012 | Deng | G06F 8/10 707/798 |
| 2012/0036375 A1* | 2/2012 | Puschini Pascual | G06F 9/5027 713/300 |
| 2012/0254433 A1* | 10/2012 | Gujral | G06F 9/5072 709/226 |
| 2012/0254597 A1* | 10/2012 | Delling | G06F 17/11 712/233 |
| 2013/0086269 A1* | 4/2013 | Bairavasundaram | G06F 9/5011 709/226 |
| 2013/0086272 A1* | 4/2013 | Chen | G06F 9/4856 709/226 |
| 2013/0086273 A1* | 4/2013 | Wray | G06F 9/5072 709/226 |
| 2013/0110961 A1* | 5/2013 | Jadhav | G06F 15/167 709/213 |
| 2013/0111033 A1* | 5/2013 | Mao | G06F 9/5072 709/226 |
| 2013/0339947 A1* | 12/2013 | Neary | G06F 9/45558 718/1 |
| 2014/0006627 A1* | 1/2014 | Arwe | H04L 29/08468 709/226 |
| 2014/0019186 A1* | 1/2014 | Li | G06Q 10/0631 705/7.22 |
| 2014/0019965 A1* | 1/2014 | Neuse | G06F 9/45533 718/1 |
| 2014/0026111 A1* | 1/2014 | Stitt | G06F 9/4484 717/101 |
| 2014/0046898 A1* | 2/2014 | Smith | G06F 17/303 707/609 |
| 2014/0215486 A1* | 7/2014 | DeRosa | G06F 9/5088 718/105 |
| 2014/0229221 A1* | 8/2014 | Shih | G06Q 10/06313 705/7.23 |
| 2014/0317167 A1* | 10/2014 | Wahl | H04L 41/12 709/201 |
| 2015/0033084 A1* | 1/2015 | Sasturkar | G06F 11/0709 714/46 |
| 2015/0149611 A1* | 5/2015 | Lissack | H04L 43/0817 709/224 |
| 2015/0244775 A1* | 8/2015 | Vibhor | G06Q 10/06 709/203 |
| 2015/0293964 A1* | 10/2015 | Morfonios | H04L 43/04 707/753 |
| 2016/0006673 A1* | 1/2016 | Thomas | G06F 9/544 709/226 |
| 2016/0062800 A1* | 3/2016 | Stanfill | G06F 9/5038 718/104 |
| 2016/0062804 A1* | 3/2016 | Stanfill | G06F 9/5027 718/104 |
| 2016/0094477 A1* | 3/2016 | Bai | H04L 47/786 709/226 |
| 2016/0103717 A1* | 4/2016 | Dettori | G06F 9/542 719/318 |
| 2016/0124742 A1* | 5/2016 | Rangasamy | H04L 47/70 717/103 |
| 2016/0191343 A1* | 6/2016 | Dong | G06F 9/5083 709/226 |
| 2016/0191660 A1* | 6/2016 | Farrell | H04L 67/32 709/219 |
| 2016/0261522 A1* | 9/2016 | Hanis | H04L 47/72 |
| 2016/0269482 A1* | 9/2016 | Jamjoom | H04L 67/1095 |
| 2016/0316003 A1* | 10/2016 | Snider | H04L 67/1002 |
| 2016/0321051 A1* | 11/2016 | Austel | H04L 67/10 |
| 2016/0323377 A1* | 11/2016 | Einkauf | H04L 67/1076 |
| 2016/0378753 A1* | 12/2016 | Taylor | H04L 67/1095 707/747 |
| 2017/0002649 A1* | 1/2017 | Sund | G06Q 10/10 |
| 2017/0060574 A1* | 3/2017 | Malladi | G06F 8/70 |
| 2017/0109210 A1* | 4/2017 | Goossens | G06F 8/44 |
| 2017/0123837 A1* | 5/2017 | Ghosh | G06F 9/45558 |
| 2017/0123941 A1* | 5/2017 | Yubamoto | G06F 11/203 |
| 2017/0228257 A1* | 8/2017 | Dong | G06F 9/5027 |
| 2017/0244808 A1* | 8/2017 | Sala | H04L 67/325 |
| 2017/0279654 A1* | 9/2017 | Kinoshita | G06F 9/5005 |
| 2017/0286499 A1* | 10/2017 | Bingham | G06F 9/45533 |
| 2017/0310596 A1* | 10/2017 | Sankar | H04L 67/1012 |
| 2017/0324832 A1* | 11/2017 | Farrell | H04L 67/1097 |
| 2018/0018205 A1* | 1/2018 | Jackson | G06F 9/5072 |
| 2018/0032380 A1* | 2/2018 | Jackson | G06F 9/5072 |
| 2018/0152534 A1* | 5/2018 | Kristiansson | H04L 67/16 |

* cited by examiner

|       | S1 | S2 | S3 | S4 | S5 | S6  | S7 |
|-------|----|----|----|----|----|-----|----|
| Day 1 | 10 | 56 | 11 | 12 | 10 | 156 | 11 |
| Day 2 | 11 | 60 | 10 | 14 | 11 | 161 | 21 |
| Day 3 | 8  | 68 | 8  | 81 | 8  | 164 | 18 |
| Day 4 | 9  | 69 | 19 | 29 | 9  | 162 | 90 |
| Day 5 | 12 | 48 | 22 | 12 | 12 | 149 | 9  |
| Day 6 | 13 | 45 | 14 | 31 | 13 | 156 | 7  |
| Day 7 | 9  | 75 | 9  | 21 | 9  | 177 | 6  |

FIG. 5C

DYNAMIC DISCOVERY AND MANAGEMENT OF MICROSERVICES FOR MULTI-CLUSTER COMPUTING PLATFORMS

FIELD

The present description relates to computer-based techniques for resource allocation management.

BACKGROUND

Business enterprises are increasingly turning to the cloud to provision and consume computing services and complex computing systems. These complex computing systems may be used by clients internal to the business enterprises or external to the business enterprises (e.g., over a private or public cloud). The complex computing systems may include various resources (e.g., software, CPUs, memories, storage devices, etc.) tailored to meet corresponding clients' resource needs.

SUMMARY

Computer-implemented systems and methods for processing a request from a client are provided. In an example computer-implemented method, a request for a computer-implemented process to be performed is received from a client. A group of computer resources responsible for performing the computer-implemented process is identified. Dependency information indicating dependency relationships between pairs of computer resources of the identified group is determined. For pairs of computer resources determined to have a dependency relationship, a cost incurred when a first computer resource of the pair invokes a second computer resource of the pair is determined at multiple points in time. It is determined whether to add, remove, or migrate additional computer resources to the group based on the cost information.

An example system for processing a request from a client includes a processing system and computer-readable memory in communication with the processing system encoded with instructions for commanding the processing system to execute steps. In executing the steps, a request for a computer-implemented process to be performed is received from a client. A group of computer resources responsible for performing the computer-implemented process is identified. Dependency information indicating dependency relationships between pairs of computer resources of the identified group is determined. For pairs of computer resources determined to have a dependency relationship, a cost incurred when a first computer resource of the pair invokes a second computer resource of the pair is determined at multiple points in time. It is determined whether to add, remove, or migrate additional computer resources to the group based on the cost information.

An example non-transitory computer-readable storage medium for processing a request from a client comprises computer executable instructions which, when executed, cause a processing system to execute steps. In executing the steps, a request for a computer-implemented process to be performed is received from a client. A group of computer resources responsible for performing the computer-implemented process is identified. Dependency information indicating dependency relationships between pairs of computer resources of the identified group is determined. For pairs of computer resources determined to have a dependency relationship, a cost incurred when a first computer resource of the pair invokes a second computer resource of the pair is determined at multiple points in time. It is determined whether to add, remove, or migrate additional computer resources to the group based on the cost information.

The subject matter described herein provides many technical advantages. As described below, the techniques of the instant disclosure implement a resource allocation manager that is capable of managing computer resources of one or more computer systems (e.g., nodes). The resource allocation manager described herein improves the performance, responsiveness, reliability, resource allocation, and memory efficiency of the one or more computer systems through its processes of (i) adding new computer resources to a group of computer resources (e.g., a discovery process), (ii) automatically scaling up and down computer resources of a given group based on a load on the system, (iii) migrating computer resources from one group to another, and (iv) fault tolerance processes, among others. These technical advantages and others are described in detail below.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 5C is a table depicting historical cost information used in determining whether to perform scale-up of computer resources.

DETAILED DESCRIPTION

Figure 1:
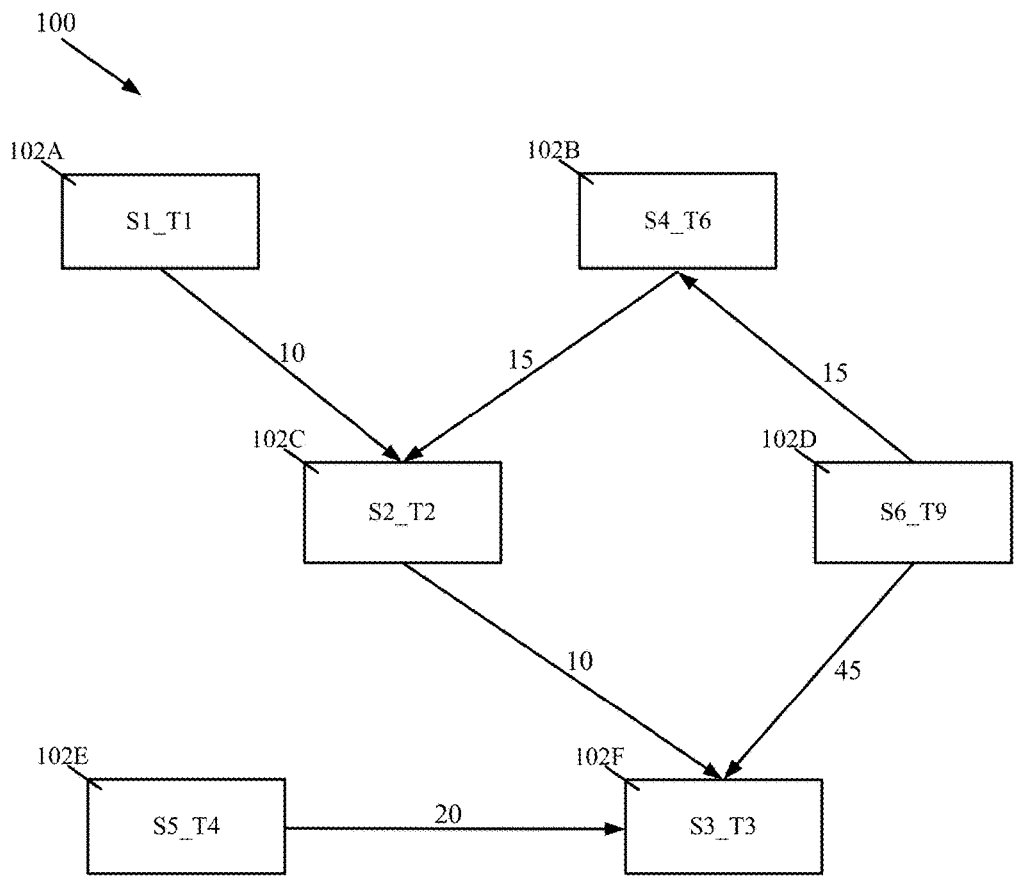
FIG. 1 is a diagram illustrating an example group of computer resources according to an embodiment of the present disclosure.

The present disclosure relates generally to systems and methods for managing computer resources. In embodiments described below, the computer resources comprise software modules (e.g., microservice software modules), but in other embodiments, the computer resources comprise computer hardware (e.g., processors, input/output ports, memories, storage devices, buses, etc.). More particularly, embodiments of the present disclosure provide systems and methods for automatically allocating computer resources that are used in servicing requests (e.g., client requests). Merely by way of example, embodiments of the present disclosure provide computer-implemented processes for automatically determining whether computer resources of a given group of computer resources should be scaled up or down. Embodiments of the present disclosure further provide computer-implemented processes for scaling up and down computer resources of a given group in an automated manner that requires no human intervention or minimal human intervention.

In embodiments, the systems and methods of the instant disclosure are used in implementing a resource allocation manager, described in greater detail below. The resource allocation manager is capable of managing computer resources of multiple nodes (e.g., computer systems). In embodiments, the resource allocation manager described herein determines whether to scale up and scale down computer resources of a given group of computer resources based on cost information. The cost information indicates a cost incurred when a first computer resource of the group invokes (e.g., calls, activates, etc.) a second computer resource of the group. As referred to herein, a "cost" does not refer to a monetary cost. Rather, in embodiments, the "cost" is indicative of an amount of time required to invoke a computer resource and/or an amount of computer resources consumed (e.g., an amount of memory utilized, a number of processing cycles utilized, etc.) by invoking a computer resource. The resource allocation manager determines the cost information at multiple points of time, and in embodiments, the cost information comprises historical cost information determined during past periods of time.

In embodiments, when the resource allocation manager determines that computer resources of a group should be scaled up, the resource allocation manager further determines a number of additional computer resources that should be added to the group. The resource allocation manager further determines, in embodiments, whether the number can be met by activating dormant computer resources of the group. If it is determined that this is not possible, in embodiments, the resource allocation manager implements a migration process, whereby computer resources of other groups are "migrated" (e.g., moved) to the group requiring additional resources. These operations of the resource allocation manager are described in further detail below.

It is noted that the present disclosure has a much broader range of applicability than the particular embodiments described herein, and that the systems and methods of the present disclosure may be used to manage computer resources in a wide variety of contexts (e.g., computer networks, computer systems, cloud systems, etc.).

Under the approaches of the instant disclosure, a resource allocation manager manages computer resources of one or more computer systems. In some embodiments, the computer resources managed by the resource allocation manager include software modules referred to herein as "microservices." The microservice architectural style is an approach to developing a single application as a suite of small services, each microservice running in its own process and communicating with lightweight mechanisms, often an HTTP-resource API. These microservices are independently deployable by fully automated deployment machinery. In embodiments, there is a bare minimum of centralized management of these services, which may be written in different programming languages and use different data storage technologies.

The microservice architectural style is in contrast to architectural styles using monolithic applications built as single units. For example, enterprise applications are often built in three main parts: a client-side user interface (e.g., including HTML pages and javascript running in a browser on a user's machine), a database (e.g., including many tables inserted into a common, and usually relational, database management system), and a server-side application. In embodiments, the server-side application handles HTTP requests, executes domain logic, retrieves and updates data from the database, and selects and populates HTML views to be sent to the browser. This server-side application is a monolith, i.e., a single, logical executable. Any changes to the system involve building and deploying a new version of the server-side application. The server-side application use of a single, logical executable is in contrast to the microservice architectural style described herein.

In embodiments, example microservices include a Database-Function-Microservice and a Report-Microservice. For instance, the Database-Function-Microservice may be responsible for performing a specified database function (e.g., a database query) in response to a client request, and the Report-Microservice may be responsible for generating a report of a predetermined type and/or format. Depending on a request load on the system, identical microservices may be spawned. For example, during a period of time in which many clients are requesting database functions, multiple Database-Function-Microservices may be spawned within one or more computer systems. Later, when fewer clients are requesting database functions, some of these microservices may be terminated or put into a dormant state. Different nodes (e.g., computer systems) may execute different numbers of microservices. For instance, in an example, a first node may execute ten instances of the Database-Function-Microservice and four instances of the Report-Microservice, and a second node may execute three instances of the Database-Function-Microservice and twelve instances of the Report-Microservice. The resource allocation manager described herein is configured to discover and manage these microservices running in each node at any point of time, thus enabling the resource allocation manager to effectively distribute processing to each of the nodes.

FIG. 1 is a diagram illustrating an example group 100 of computer resources according to an embodiment of the present disclosure. In the example group 100 of FIG. 1, the computer resources of the group include microservices 102A, 102B, 102C, 102D, 102E, and 102F. In other examples, the computer resources of the group 100 include hardware components (e.g., processors, input/output ports, memories, storage devices, buses, etc.). In embodiments, the resource allocation manager receives a request for a computer-implemented process to be performed from a client (e.g., a computer system, a software module executed on a computer system, a network element, etc.). The resource allocation manager further identifies the group 100 as being responsible for performing the computer implemented process. For instance, in embodiments, the group 100 is uniquely identified by an identifier "groupID." When a received client request specifies the unique groupID of the group 100, the resource allocation manager identifies the group 100 as being responsible for performing the computer-implemented process.

Figure 2A:
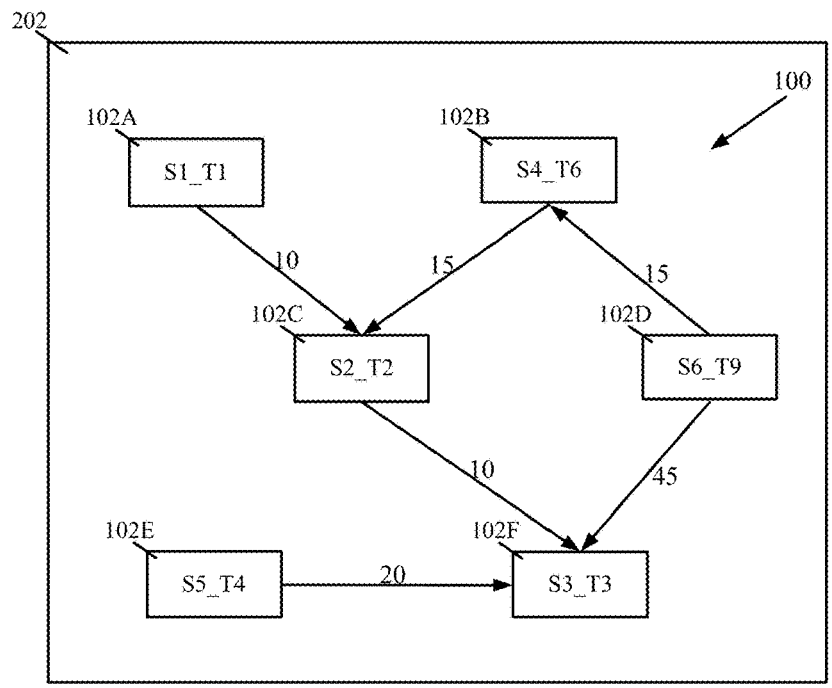
FIG. 2A illustrates the group of FIG. 1 implemented via a single computer system.

In embodiments, the group 100 of computer resources can be implemented using a single node (e.g., a single computer system) or multiple nodes. For instance, in the example of FIG. 2A, all of the microservices 102A, 102B, 102C, 102D, 102E, and 102F of the group 100 are executed on a single node 202. By contrast, in the example of FIG. 2B, microservices 102A, 102B are executed on a first node 252, microservices 102C, 102E are executed on a second node 254, and microservices 102D, 102F are executed on a third node 256. The multiple nodes 252, 254, 256 may be considered to be parts of a single "cluster" of nodes, or the multiple nodes 252, 254, 256 may be considered to be parts of multiple clusters. As referred to herein, a "cluster" comprises a group of multiple nodes. Regardless of whether the microservices of a group are executed on a single node or multiple nodes, a communication framework is used to enable communications between the microservices. It is noted that the "groups" of computer resources referred to herein comprise computer resources that are grouped logically, and that such computer resources need not be grouped physically (e.g., a group of computer resources need not be implemented using a single node).

As noted above, in embodiments, a received client request includes a groupID specifying a group of computer resources (e.g., the group 100 shown in FIGS. 1-2B) that is responsible for servicing the request. In some examples, if no groupID is associated with the request, the resource allocation manager assigns a default groupID to the request. Further, in embodiments, client requests include a field referred to as "processingScope," which identifies a scope of processing the request. Example scopes supported by the resource allocation manager include (i) intra_node, (ii) intra_cluster, and (iii) inter_cluster. The intra_node scope indicates that the request must be processed by microservices running within a single node. The intra_cluster scope indicates that the request must be processed by microservices running within a single cluster (e.g., a cluster in which the request was submitted or another cluster). The inter_cluster scope indicates that the request can be processed by any microservice(s) running among multiple clusters. For instance, if a request is submitted to a group that includes microservices running in multiple clusters, and the "processing-scope" of that request is set to INTRA_CLUSTER, then the resource allocation manager will consider only those microservices running within the current cluster for processing it. If there are no microservices in the current cluster, then the request will be marked as "failed" and the administrator will be notified.

Each of the microservices 102A, 102B, 102C, 102D, 102E, and 102F of the group 100 is associated with multiple parameters. In an embodiment, each of the microservices 102A, 102B, 102C, 102D, 102E, and 102F is associated with (i) a "microserviceId" parameter that uniquely identifies the microservice, and (ii) a "microserviceType" parameter that identifies the type of the microservice. In examples, the "type" of the microservice is indicative of one or more functions or processes performed by the microservice. For example, a database-function microservice (described above) will have its type as "database-function." Two microservices are said to be identical if they are of the same microserviceType. Further, in embodiments, each of the microservices 102A, 102B, 102C, 102D, 102E, and 102F has a "status" parameter. In embodiments, a microservice can have one of five states: (1) nascent (e.g., the resource has been initialized and is ready to be a part of the platform); (2) active (e.g., the microservice is active and ready to service requests); (3) inactive (e.g., the microservice is currently inactive and doesn't accept any requests but it is still in running state); (4) terminated (e.g., the microservice has been terminated); and (5) disconnected (e.g., the microservice is presently not reachable, and it may or may not connect back at a later point of time, where the microservices that are disconnected for more than a configured amount of time are to be treated as terminated).

In embodiments, the resource allocation manager responsible for managing the group 100 determines dependency information indicating dependency relationships between pairs of computer resources of the group 100. A pair of computer resources have a dependency relationship if a first computer resource of the pair must invoke a second computer resource of the pair to complete a task. For instance, a "report" microservice responsible for generating a report may need to invoke a "database" microservice in order to generate the report. The report microservice may call the database microservice to perform a database query, thus providing the necessary data to the report microservice for generating the report. Further, for pairs of computer resources of the group 100 determined to have a dependency relationship, the resource allocation manager determines cost information indicating a cost incurred when a first computer resource of the pair invokes a second computer resource of the pair.

To illustrate an example of such dependency information and cost information, FIG. 1 illustrates an example microservice graph that is generated and maintained by the resource allocation manager. A microservice graph is a weighted directed graph with (i) vertices representing microservices in a microservice group, and (ii) edges representing the dependency between them. As explained above, every microservice is uniquely identified by a microserviceId assigned to it, and every microservice has an associated microserviceType. Sx_Ty in the example of FIG. 1 denotes a microservice with microserviceId "x" and microserviceType "y." Every microservice in the platform is associated with a microservice group. The group 100 of FIG. 1 is an example of a group. If no groupId is assigned to a microservice, then it becomes a part of the "default" microservice group. A separate microservice graph is maintained by the resource allocation manager for each microservice group in the platform, and thus, there could be multiple microservice graphs in the platform at any point of time. A weight associated with the edge "e" ($S_m$, $S_n$) in the microservice graph represents the cost that will be incurred when $S_m$ calls/invokes $S_n$. This cost is referred to herein as "Microservice Invocation Cost" ($MIC_{mn}$). For instance, in the example of FIG. 1, a cost to invoke S3_T3 by S5_T4 is 20. Similarly, a service call sequence where S1_T1 calls S2T2, which in turn calls S3T3 is 20 (i.e., 10+10=20). A path (microservice call path) in the graph with a low cost value is desirable.

The resource allocation manager uses a cost function to determine the weights associated with the edges (i.e., the costs) of a microservice graph. In embodiments, the cost function is a user-defined function (e.g., the cost function can be defined by a system administrator) that is used to periodically calculate the cost of edges in a microservice graph. An example cost function comprising a weighted function is as follows:

$$CF = W_1*P_1 + W_2*P_2 + W_3*P_3 + W_4*P_4 + W_5*P_5 + W_6*P_6,$$

where $W_1$, $W_2$, $W_3$, $W_4$, $W_5$ and $W_6$ represent the weights associated with the parameters and $W_1+W_2+W_3+W_4+W_5+W_6=1$. In this example cost function, $P_1$ represents a total number of requests currently being processed by the given microservice. In a different embodiment, $P_1$ represents a ratio of total number of requests currently being processed to the maximum number of requests serviceable by that microservice. The maximum number of requests serviceable is specified when the microservice is added to the platform or group, in embodiments. This parameter captures the general load on the microservice at a given point of time. Further, in the example cost function above, the parameter $P_2$ represents a number of requests currently being processed by the microservice from a given caller microservice. The parameter $P_3$ represents an average time taken by the microservice in processing requests. The parameter $P_4$ represents an average time taken by the microservice in processing requests from a given caller microservice. This parameter captures the response of the microservice with respect to a given caller microservice. The parameter $P_5$ represents an average time taken by the microservice during a last "x" invocations and thus captures the recent performance of the microservice. The parameter $P_6$ represents a processing Scope. In embodiments, each scope is assigned a value in such a way that $Cost_{INTRA\_NODE} < Cost_{INTER\_NODE} < Cost_{INTER\_CLUSTER}$. For instance, $Cost_{INTRA\_NODE} = 5$, $Cost_{INTER\_NODE} = 10$, and $Cost_{INTER\_CLUSTER} = 15$.

Figure 2B:
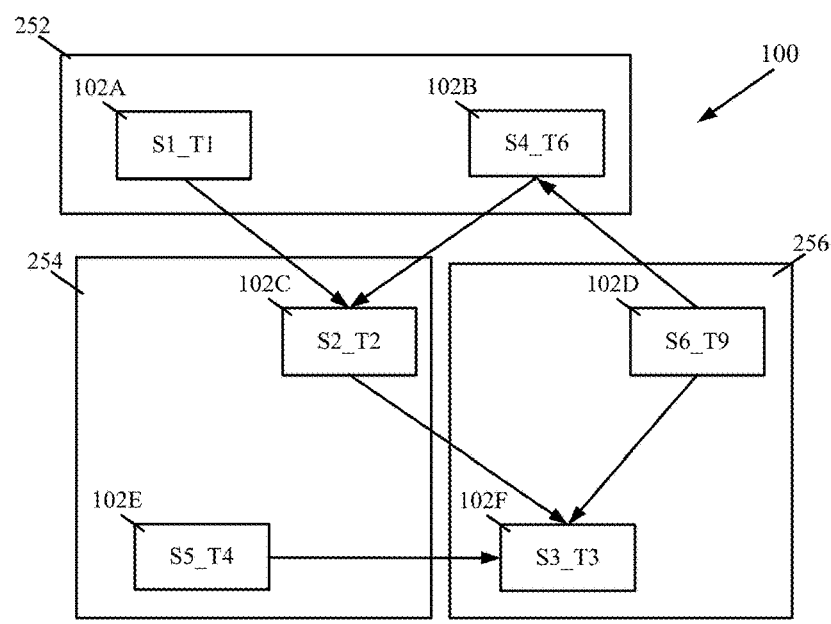
FIG. 2B illustrates the group of FIG. 1 implemented via multiple computer systems.

In embodiments, the resource allocation manager forms different types of groups of computer resources. For instance, in examples, homogenous and heterogeneous microservice groups are formed. Microservice groups which are formed by grouping microservices of the same microserviceType are known as "homogeneous" microservice groups. Microservice groups which are formed by grouping microservices of different microserviceType are known as "heterogeneous" microservice groups. The example group 100 shown in FIGS. 1-2B is a heterogeneous microservice group, as evidenced by the different types T1-T6 of the microservices 102A-102F. In some embodiments, tenant-based groups are formed by the resource allocation manager. Multiple heterogeneous microservices groups (e.g., 3 database microservices, 2 report microservices) can be defined and assigned to a given tenant in a multi-tenant (e.g., cloud) environment. Thus, for instance, high profile tenants/users can have better response time as compared to low profile tenants/users, as the high profile tenants/users can be assigned to (i) a dedicated microservices group (e.g., not shared among other tenants), (ii) a group with a higher number of microservices to service the requests for that tenant, and/or (iii) a group running on high performance nodes/machines (e.g., with higher number of cores, main memory, etc.). Further, in some embodiments, the resource allocation manager forms "master" and "slave" groups. For instance, a set of microservices can be grouped together to act as a master group, that is primarily responsible for servicing all requests submitted to the platform. Another set of microservices can be grouped together to act as a slave group that is responsible for servicing requests when the master group can no longer service any requests (e.g., due to high volumes of requests submitted to the platform and/or some or all of the microservices in the master group have gone down due to maintenance or some unforeseeable circumstances, etc.).

Figure 2C:
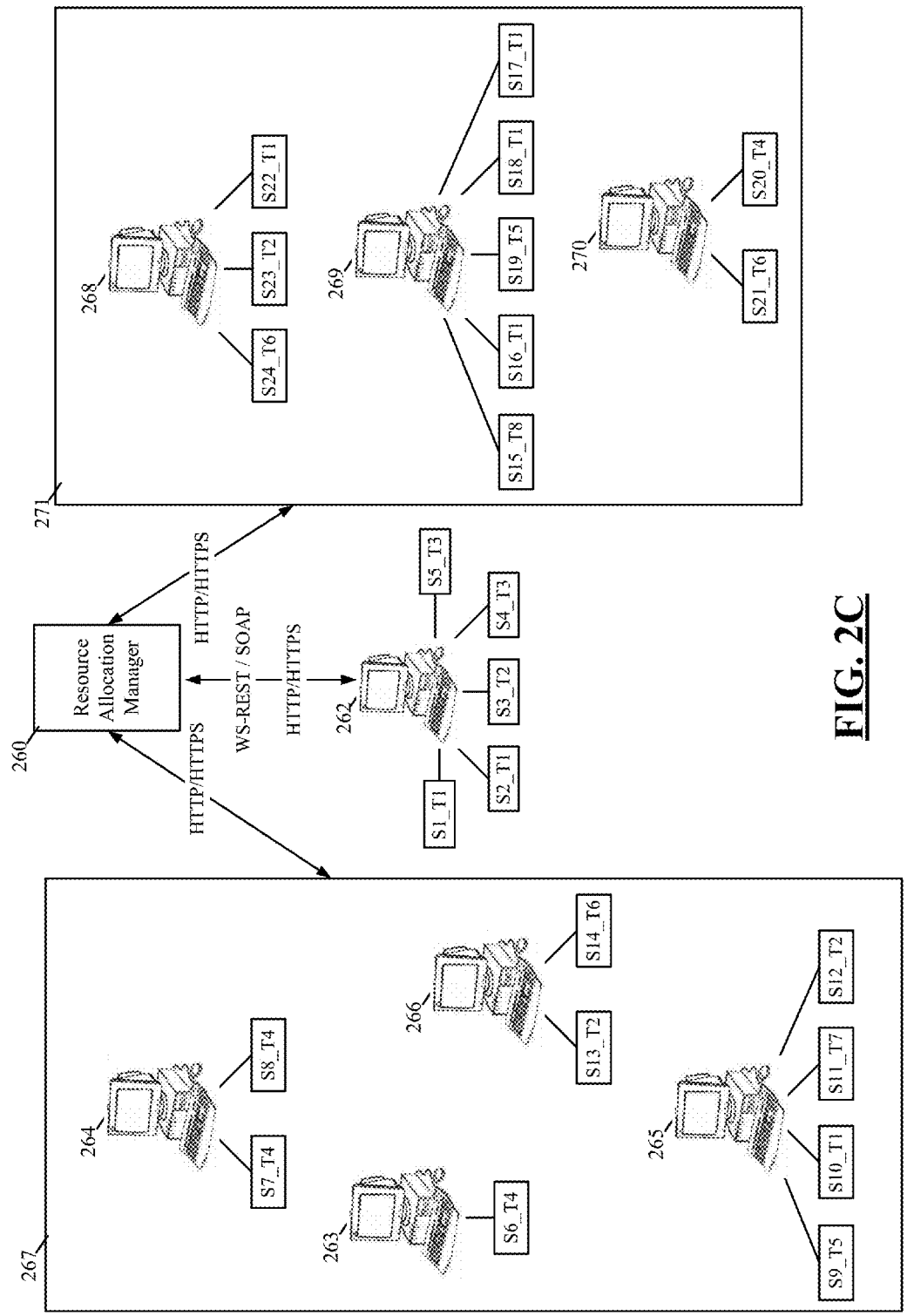
FIG. 2C illustrates an example system diagram according to an embodiment of the present disclosure.

To illustrate examples of the above-described homogenous, heterogeneous, slave, and tenant-based groups, reference is made to FIG. 2C. This figure illustrates an example system diagram according to an embodiment of the present disclosure. In the example system diagram, a node 262 comprises a computer system that represents a single-node cluster. The node 262 is configured to execute microservices S1_T1, S2_T1, S3_T2, S4_T3, and S5_T3, where Sx_Ty denotes a microservice with microserviceId "x" and microserviceType "y." Accordingly, in this embodiment, the node 262 is configured to execute microservices of types "1," "2", and "3."

The example system diagram of FIG. 2C further includes a cluster 267, with the cluster 267 comprising nodes 263, 264, 265, 266. The node 263 comprises a computer system that is configured to execute microservice S6_T4. The node 264 comprises a computer system that is configured to execute microservices S7_T4 and S8_T4. The node 265 comprises a computer system that is configured to execute microservices S9_T5, S10_T1, S11_T7, and S12_T2. The node 266 comprises a computer system that is configured to execute microservices S13_T2 and S14_T6. The example system diagram of FIG. 2C further includes a cluster 271, with the cluster 271 comprising nodes 268, 269, 270. The node 268 comprises a computer system that is configured to execute microservices S24_T6, S23_T2, and S22_T1. The node 269 comprises a computer system that is configured to execute microservices S15_T8, S16_T1, S17_T1, S18_T1, and S19_T5. The node 270 comprises a computer system that is configured to execute microservices S20_T4 and S21_T6.

In an example embodiment, microservices S6_T4, S7_T4, and S8_T4 comprise a homogenous microservice group of type "4" spanning across nodes 263 and 264. Microservices S9_T5, S11_T7, and S14_T6 comprise a heterogeneous microservice group of types "5," "6," and "7" spanning across nodes 265 and 266. Microservices S10_T1 and S13_T2 comprise a slave microservice group of types "1" and "2" spanning across nodes 265 and 266. Microservices S15_T8, S16_T1, S17_T1, S18_T1, S19_T5, S20_T4, and S21_T6 comprise a tenant-based microservice group for one or more tenants with types "1," "4," "5," "6," and "8" spanning across nodes 269 and 270. Microservices S1_T1, S2_T1, S3_T2, S4_T3, S5_T3, S12_T2, S22_T1, S23_T2, and S24_T6 comprise a set of microservices that do not belong to any particular group.

In the example embodiment of FIG. 2C, the nodes 262, 263, 264, 265, 266, 268, 269, 270 communicate with a resource allocation manager 260. Functions of the resource allocation manager 260 are described throughout this disclosure. As illustrated in FIG. 2C, the nodes 262, 263, 264, 265, 266, 268, 269, 270 communicate with the resource allocation manager 260 via a protocol such as Hypertext Transfer Protocol (HTTP), HTTP Secure (HTTPS), or another protocol. Further, in some embodiments, one or more of the nodes 262, 263, 264, 265, 266, 268, 269, 270 are configured to communicate with the resource allocation manager via a protocol such as Simple Object Access Protocol (SOAP) or WS-REST.

Figure 3:
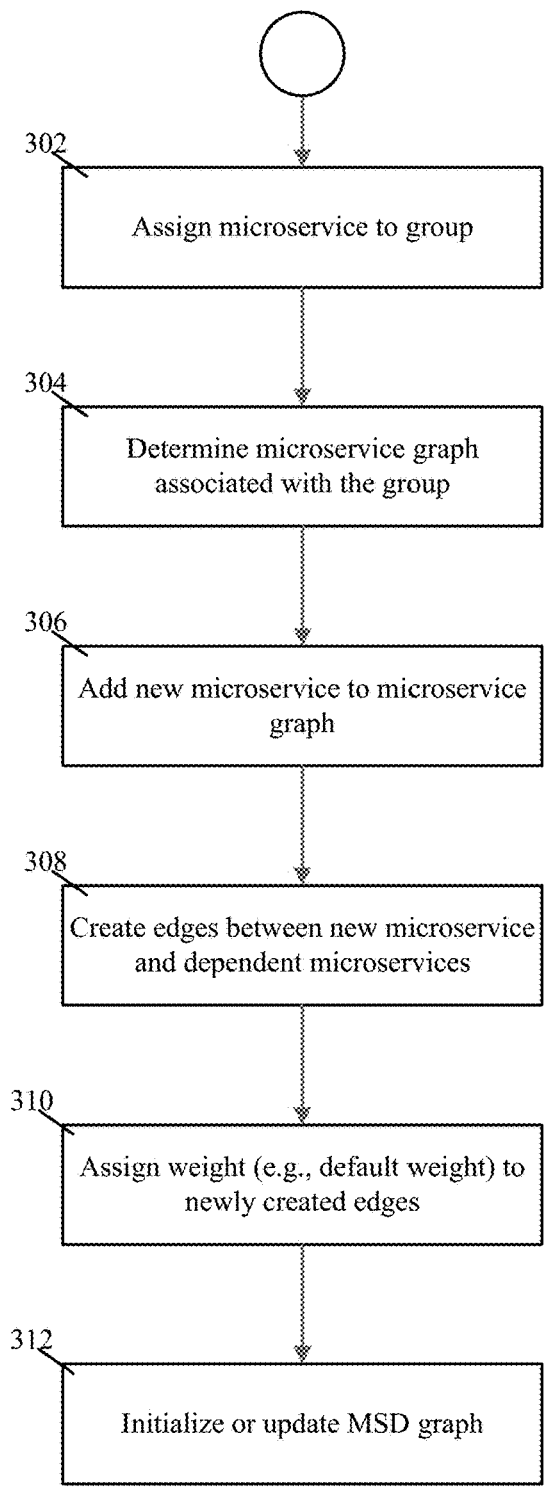
FIG. 3 is a flowchart depicting operations for adding a new computer resource to a group of computer resources according to an embodiment of the present disclosure.

FIG. 3 is a flowchart depicting operations for adding a new microservice to a group. The operations of FIG. 3 may be referred to as being a "discovery" process, which is performed by the resource allocation manager to discover and group new microservices. In a step 302, the resource allocation manager assigns the new microservice to a group. Whenever a new microservice is added to the platform, the microservice sends a notification message with message-type "SERVICE_DISCOVERY" and several meta-data information about the microservice. In embodiments, the discovery message contains information specifying microserviceType, groupId, microservice dependency information, and maximum number of serviceable requests, among other information. The resource allocation manager receives these messages and identifies the groupId specified in the message. If there is no groupId specified in the discovery message, the resource allocation manager checks for any dynamic grouping rules configured in the platform. Dynamic grouping rules provide a way to group microservices dynamically, when static grouping is not feasible. In embodiments, one or more rules are specified in a predicate format, which may be executed in a given order. The following are example rules:

Rule#1: (groupId==NULL && microserviceType==MicroserviceType.Database) then groupId=50; and Rule#2: (groupId==NULL && microserviceId in (10, 2500) then groupId=12, where group 50 implies a group dedicated for database services, and group 12 implies a group assigned to a given tenant in a cloud environment.

If there are no dynamic grouping rules defined or the dynamic grouping rules defined do not assign a groupId to the new microservice being added, then a default groupId is assigned to the new microservice. Subsequently, in a step 304, the resource allocation manager identifies a microservice graph associated with the identified group. Example groups and their corresponding microservice graphs are depicted in FIGS. 1-2B and discussed above. If the microservice graph does not yet exist, the resource allocation manager creates and initializes a microservice graph and associates it with the groupId identified. In a step 306, the resource allocation manager adds the new microservice to the microservice graph.

In a step 308, the resource allocation manager identifies any microservice dependency information associated with the new microservice. If dependency information is found, then the resource allocation manager searches for the immediate neighbors of the new microservice in the microservice graph. If dependent services exist in the graph, the resource allocation manager creates an edge between the new microservice and each of the dependent microservices. In a step 310, the resource allocation manager assigns a pre-configured default weight (e.g., cost) configured by the administrator of the platform to each of the newly created edges. In a step 312, the resource allocation manager performs static initialization and maintenance of a microservice dependency (MSD) graph. An MSD graph is a directed graph whose vertices represent microservices in the platform and edges represent the dependencies between them. The edges defined in the MSD graph can be of two types: static dependency link and dynamic dependency link. MSD graphs differ from the above-described microservice graphs and are explained in further detail below with reference to FIGS. 4A and 4B.

Figure 4A:
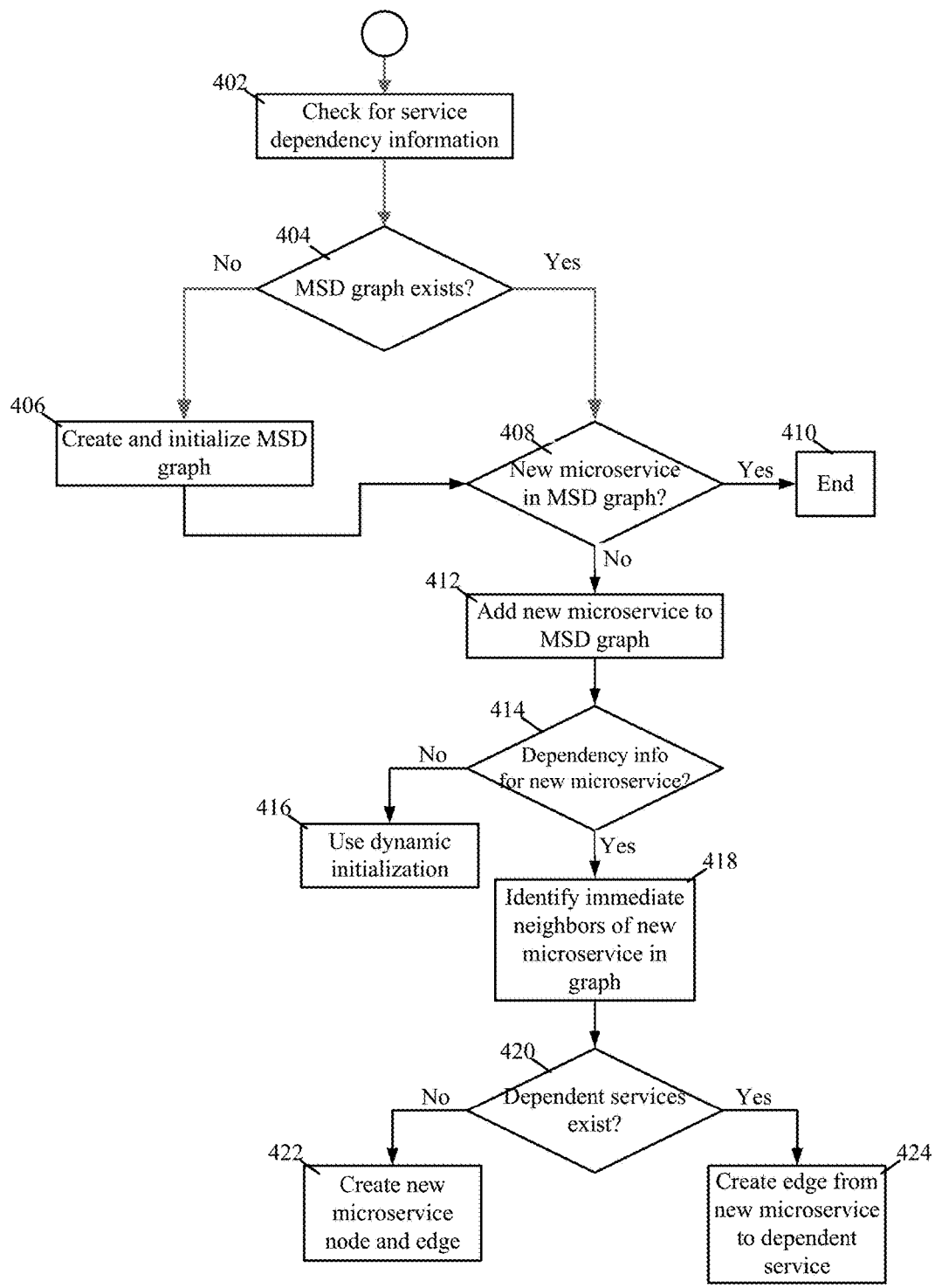
FIG. 4A is a flowchart depicting operations for generating a microservice dependency (MSD) graph according to an embodiment of the present disclosure.

FIG. 4A is a flowchart depicting operations for generating an MSD graph according to a "static initialization" process. In embodiments, the operations of FIG. 4A are performed by the resource allocation manager described herein. At a step 402, whenever a new microservice is added to a microservice graph, the resource allocation manager checks for any service dependency information specified in the service-discovery message sent by the microservice. In embodiments, microservice dependency information includes a list of services on which the current microservice is dependent upon (e.g., that it may call during execution). At a step 404, it is determined if an MSD graph currently exists. If the MSD graph does not yet exist, at a step 406, the resource allocation manager creates and initializes a new MSD graph. If the MSD graph exists, at a step 408, the resource allocation manager searches the MSD graph for the microservice being added. As can be seen in FIG. 4A, the flowchart also proceeds to the step 408 after completion of the step 406. If it is determined at the step 408 that the new microservice does not exist, at a step 412, it is added to MSD graph. If it is determined at the step 408 that the new microservice does exist in the MSD graph, a step 410, no operation is performed.

Subsequently, in a step 414, the resource allocation manager checks for any microservice dependency information associated with the new microservice. If dependency information is found, at a step 418, the resource allocation manager identifies the immediate neighbors of the current microservice in the MSD graph. If the new microservice was recently added to MSD graph, then there may not be any immediate neighbors. If new microservice was already present in the MSD graph, then there might be some or all of the immediate neighbors mentioned in the dependency information. In any case, at a step 420, the resource allocation manager checks for the existence of each of the dependent services listed in the dependency information of the new microservice in MSD graph. If the dependent service exists in the MSD graph, at a step 424, the resource allocation manager creates a static dependency link (e.g., edge) from the microservice node to the dependent microservice node, if and only if the link does not exist already in the MSD graph. If the dependent service does not exist in MSD graph, at a step 422, the resource allocation manager creates a new microservice node to represent the dependent microservice in the MSD graph, and then creates a static dependency link (e.g., edge) from the current microservice node to the dependent microservice node.

As described above, in the step 414, the resource allocation manager checks for any microservice dependency information associated with the new microservice. If no such dependency information is associated with the new microservice, then in embodiments, a "dynamic initialization" process is used to create the MSD graph. In some scenarios, microservices may be launched without dependency information. In some other scenarios, not all dependent services may get invoked in all code paths of a microservice. Some services may be invoked only when certain conditions are met. Such optional services may be omitted from dependency information associated with a microservice. Accordingly, in such scenarios, the dynamic initialization process is utilized in generating the MSD graph.

Figure 4B:
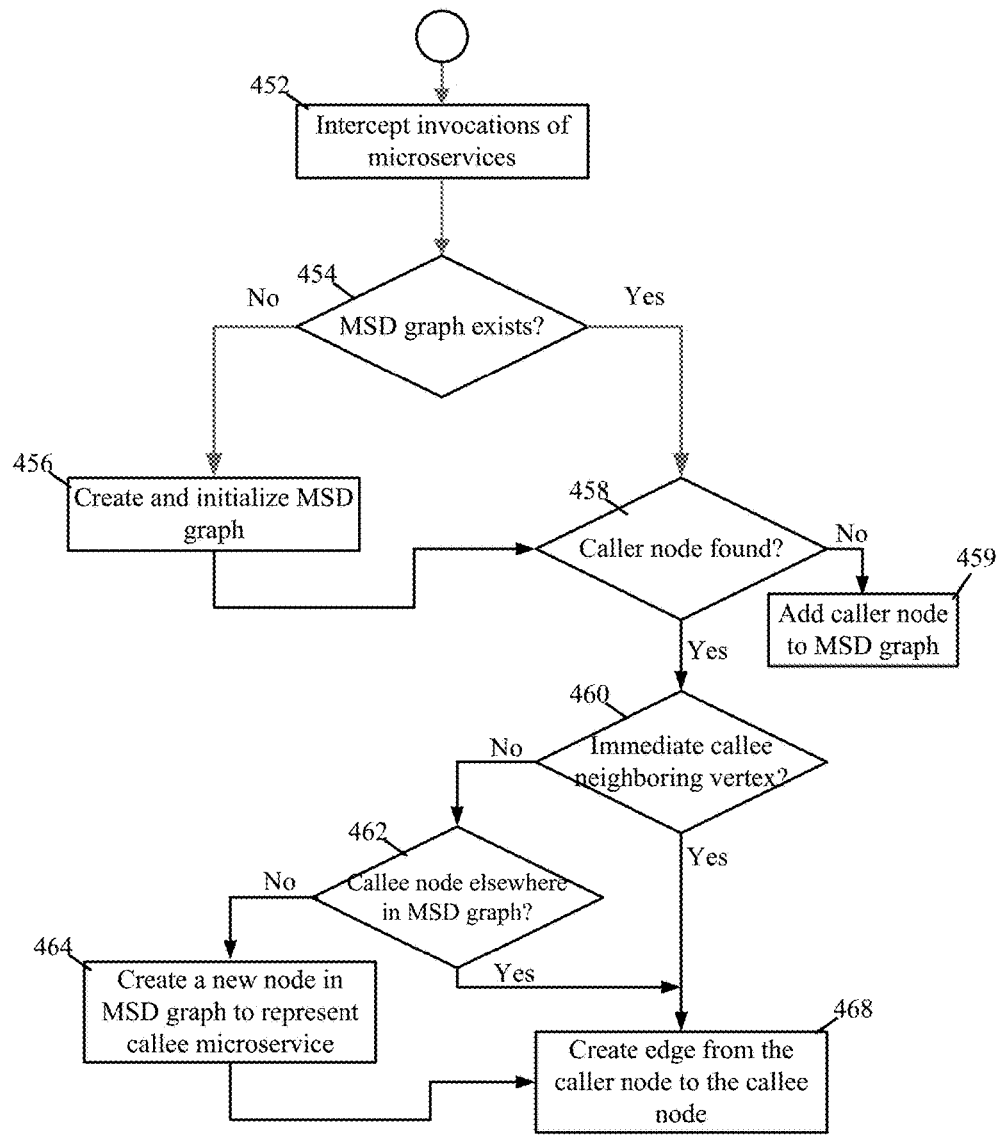
FIG. 4B is a flowchart depicting operations of another method for generating an MSD graph according to an embodiment of the present disclosure.

FIG. 4B is a flowchart depicting operations for generating an MSD graph according to a "dynamic initialization" process. In embodiments, the operations of FIG. 4B are performed by the resource allocation manager described herein. As shown at a step 452 in FIG. 4B, whenever a microservice invokes another microservice, the resource allocation manager intercepts the invocation. At a step 454, it is determined if an MSD graph currently exists. If the MSD graph does not currently exist, at a step 456, the resource allocation manager creates and initializes the MSD graph. If the MSD graph exists, at a step 458, the resource allocation manager searches the MSD graph for a caller microservice node. As can be seen in FIG. 4B, the flowchart also proceeds to the step 458 after completion of the step 456.

If the caller node is not found in the MSD graph, at a step 459, the caller node is added to the MSD graph. If the caller node is found in the MSD graph, at a step 460, the resource allocation manager checks if there is an immediate callee neighboring vertex associated with the caller microservice node. If the callee microservice node is not found as the immediate neighbor, at a step 462, the resource allocation manager searches the MSD graph for a callee microservice node. If the callee microservice node is found in the MSD graph, then at a step 468, the resource allocation manager creates a dynamic dependency link (e.g., edge) from the caller microservice node to the callee microservice node. If the callee microservice node is not found in MSD graph, then at a step 464, the resource allocation manager creates a new node (e.g., vertex) in the MSD graph to represent the callee microservice. After the step 464 is completed, the flowchart proceeds to the step 468 (described above).

In embodiments, the resource allocation manager uses the MSD graph (e.g., created via either the "static initialization" or the "dynamic initialization" processes described above) to perform admission control. Specifically, in embodiments, the MSD graph is used to determine whether a request to a given service can be processed or not. The resource allocation manager determines this by identifying all of the dependent microservices of the current microservice and checking whether they are in the ACTIVE state. In embodiments, the resource allocation manager stores a probabilistic dependency value of a given microservice against its dependent microservices. The resource allocation manager calculates this by identifying the ratio of a number of times the given microservice invoked a dependent microservice to a total number of times the given microservice was invoked during a given period. For example, if S2 was executed 95 times out of 100 along with the given microservice S1 during last 90 days, then the resource allocation manager calculates the probabilistic dependency index as being 0.95. Further, in embodiments, when a request is submitted, an "execution-probability" field can be set that indicates that if the probabilistic-dependency-index is greater than a value of the field "execution-probability," the request will be processed, else the request will be rejected.

Figure 5A:
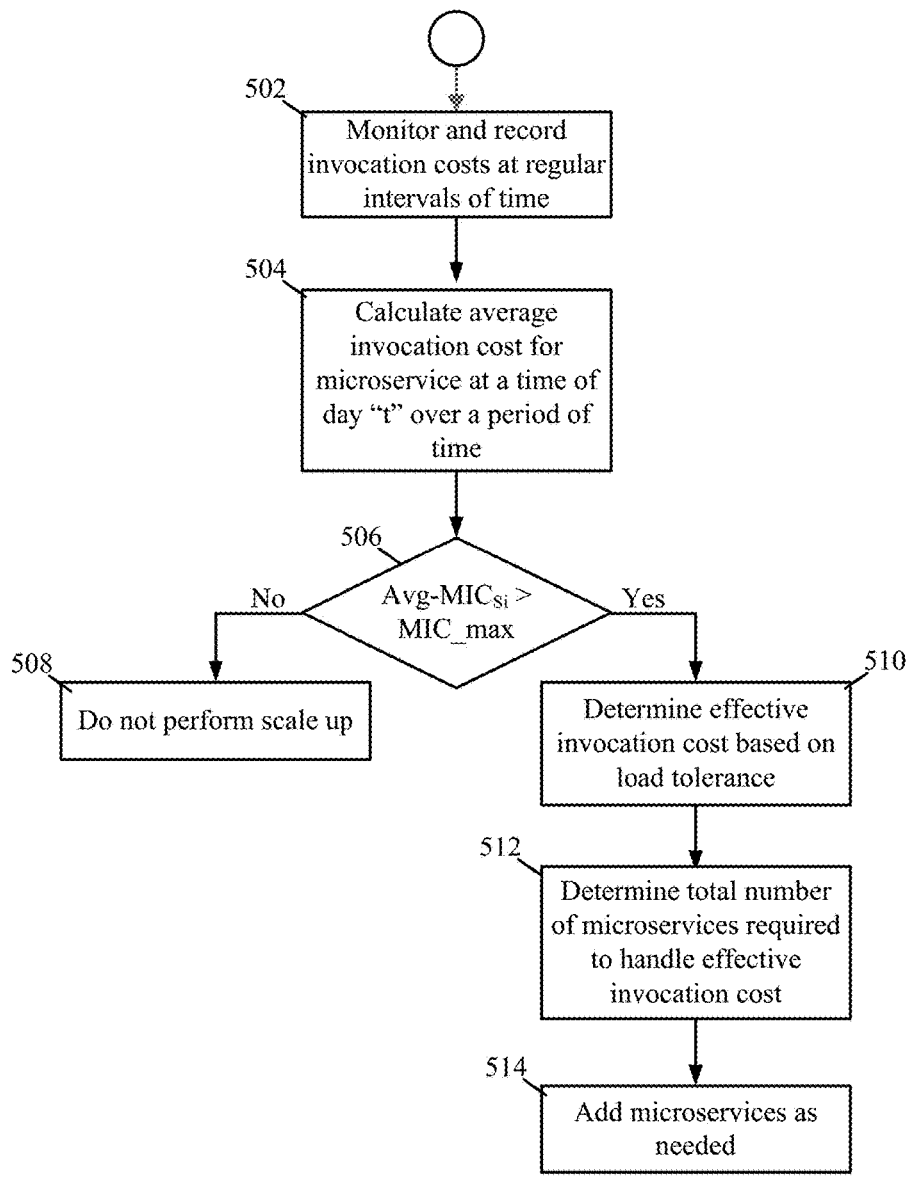
FIG. 5A is a flowchart depicting operations for performing dynamic scale-up of computer resources in a group according to an embodiment of the present disclosure.
Figure 5B:
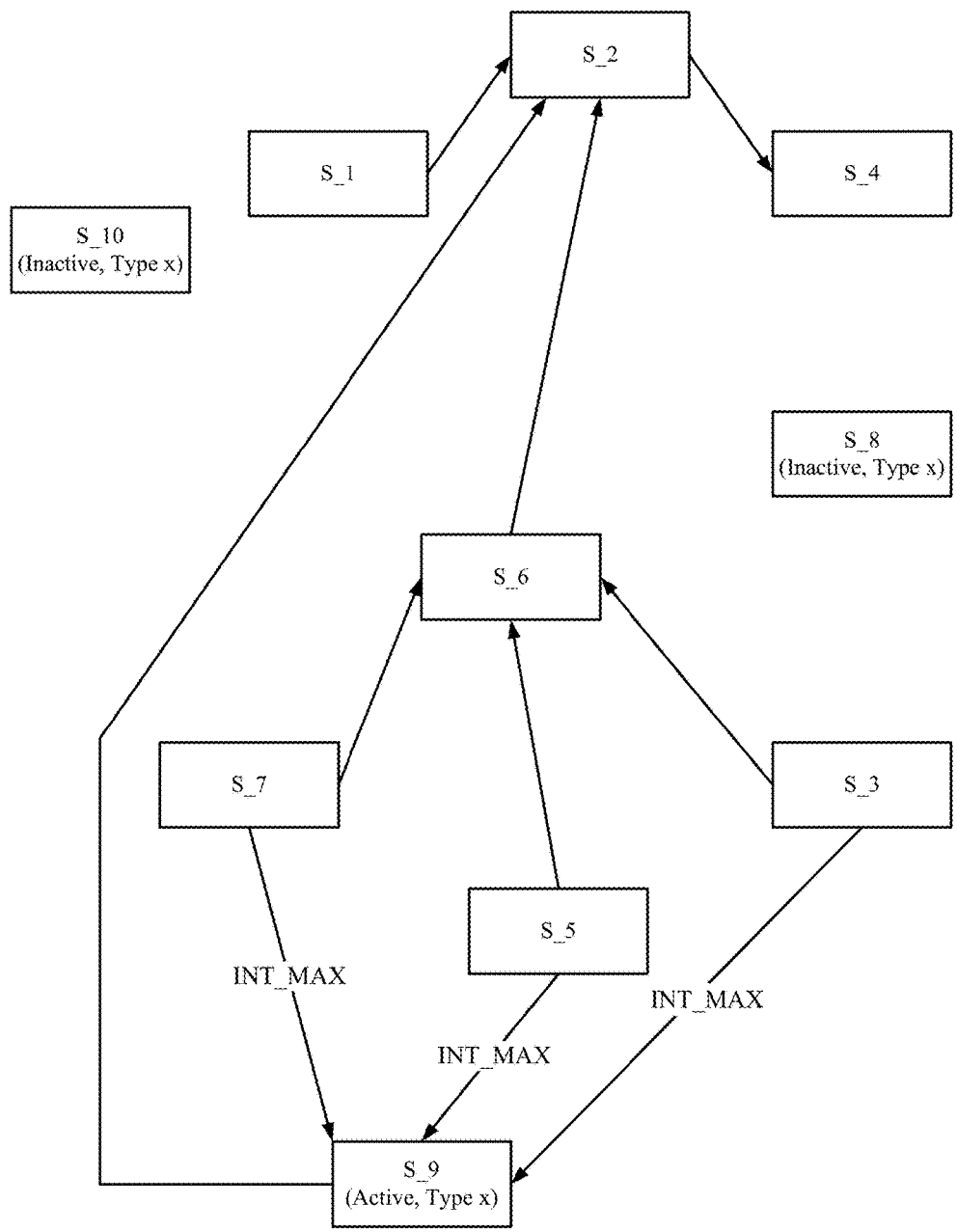
FIG. 5B is a diagram illustrating an example microservice graph according to an embodiment of the present disclosure.
Figure 5D:
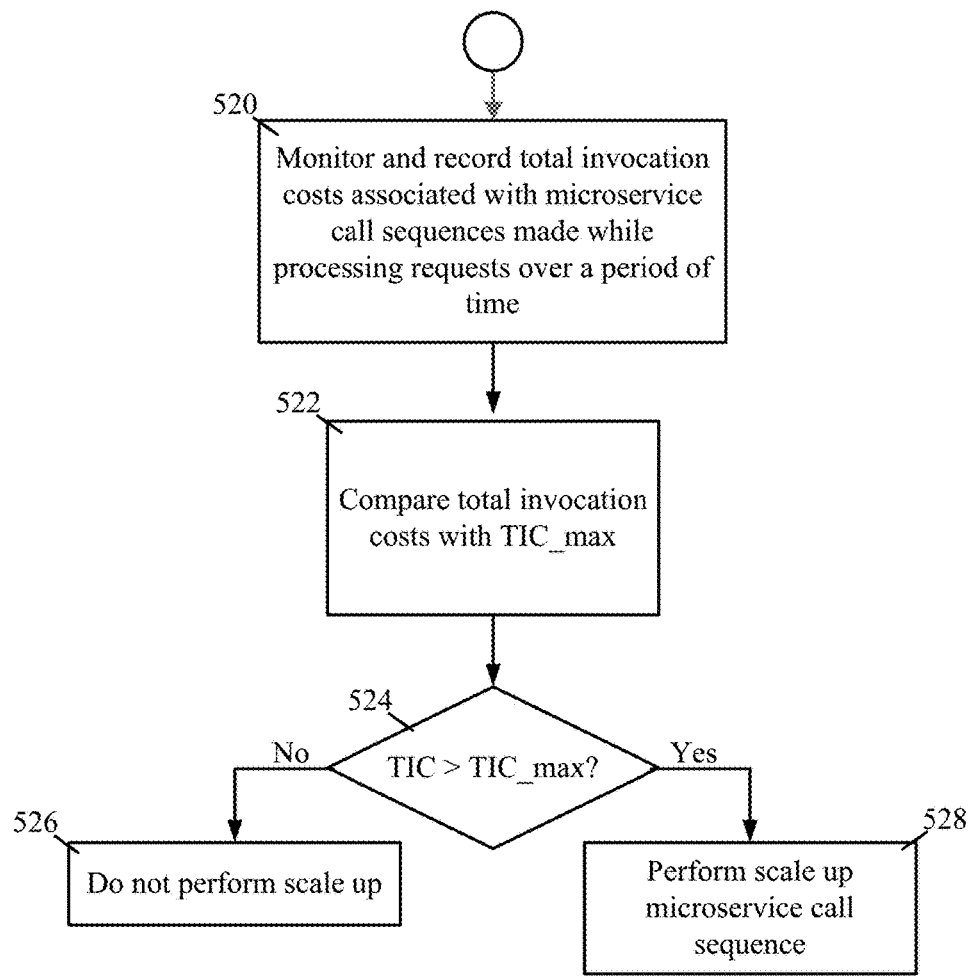
FIG. 5D is a flowchart depicting operations of another method for performing dynamic scale-up of computer resources in a group according to an embodiment of the present disclosure.

FIG. 5A is a flowchart depicting operations for performing dynamic scale-up of computer resources in a group according to an embodiment of the present disclosure. The operations of FIG. 5A are performed by the resource allocation manager described herein, in embodiments. In these embodiments, the resource allocation manager supports dynamic scale up of microservices of a given group during runtime. If a general load pattern in a group or multiple groups is high, the resource allocation manager scales up microservices of a group by adding additional microservices of the required type to the group. Example "groups" of computer resources that are responsible for servicing client requests are illustrated in FIGS. 1-2B and described above with reference to those figures. The flowchart of FIG. 5A illustrates steps of one method for achieving the scale-up, and the flowchart of FIG. 5D illustrates steps of another method for achieving this.

In FIG. 5A, at a step 502, the resource allocation manager monitors and records the $MIC_{Si}$ (i.e., invocation cost of microservice "i") of each microservice in the microservice group during regular intervals of time. As described herein, in embodiments, for each microservice group, the resource allocation manager generates and maintains a corresponding microservice graph. Thus, in the step 502, the resource allocation manager monitors and records the $MIC_{Si}$ of each microservice in the microservice graph during the regular intervals of time. If there are multiple microservices invoking a given microservice, then the average value is identified. For example, consider the microservice graph shown in FIG. 5B. In order to calculate $MIC_{S6}$ at a given point of time, the resource allocation manager (i) determines the cost associated with each of the edges incident on S6, i.e., (S7, S6), (S5, S6) and (S3, S6), and (ii) determines the average of these costs. The average of these costs is $MIC_{S6}$ at that given point of time.

In embodiments, the resource allocation manager records the MIC of each microservice of the group at regular intervals of time for a predetermined period of time. For instance, the resource allocation manager may record the MIC of each microservice of the group hourly over a period of 7 days. FIG. 5C depicts an example dataset recorded by the resource allocation manager for a time of day "t" over a time period of 7 days in the past. At a step 504, the resource allocation manager calculates an average invocation cost Average $MIC_{Si}$ (i.e., Avg-$MIC_{Si}$) for each microservice of the group at a time of day "t" over a predetermined period of time (e.g., 7 days). In embodiments, the resource allocation manager does this by calculating the ratio of sum of MIC recorded over the period to the total number of samples/days considered. As an example, from the dataset shown in FIG. 5C, it can be seen that Avg-$MIC_{S1}$=10.29 (i.e., (10+11+8+9+12+13+9)/7 days).

In embodiments, a value MIC_max is a pre-configured value maintained by the resource allocation manager that indicates a maximum invocation cost that can be associated with a given microservice type. This can be configured for all microservices in the platform or on a per-microservice-type basis (i.e., separate configuration for each microservice type). If an MIC value is higher than MIC_max, this indicates that the given microservice is overloaded and may perform (or is already performing) poorly. In a step 506, the resource allocation manager compares the Avg-$MIC_{Si}$ of each microservice Si of the group with the MIC_max associated with the microservice type of Si. If for a given microservice Si, Avg-$MIC_{Si}$<MIC_max, then as shown at a step 508, no scale-up is performed for that microservice. If for a given microservice Si, Avg-$MIC_{Si}$>MIC_max, then scale-up needs to be performed for that service. Example steps for performing scale-up of microservices are steps 510, 512, and 514 of FIG. 5A.

In the steps 510 and 512, the resource allocation manager identifies the Scale-Up Factor (SUF), which is defined as the number of additional microservices required by the group. In embodiments, a load tolerance associated with the platform defines a percentage of additional (e.g., unplanned) load that a microservice should be able to handle. This is configured by the administrator and is applicable to all microservices in the platform, in embodiments. At the step 510, the resource allocation manager identifies an effective $MIC_{Si}$ by applying the load tolerance percentage to the Average $MIC_{Si}$ of each microservice in the group that has been identified for scale up as follows:

$$\text{Effective-MIC}_{Si} = \text{Avg-MIC}_{Si} * \text{Load Tolerance}.$$

Thus, for example, if load tolerance=120%, then Effective $MIC_{S6}$=160.71*1.2=192.85.

At the step 512, the resource allocation manager determines a total number of microservices required for the Effective-$MIC_{Si}$ of each microservice. The total number is calculated as a ratio of Effective-$MIC_{Si}$ to MIC_max, as defined for the microservice-type of Si. Thus, in embodiments, a total number of microservices required is equal to (Effective-$MIC_{Si}$/MIC_max). To illustrate this, consider an example in which MIC_max is equal to 50. The total number of microservices required to handle the current MIC of S6=192.85/50=4, because in embodiments, the resource allocation manager always rounds up to the higher value. At a step 514, the SUF is identified and microservices are added to the group as needed. The SUF is determined as being one less than the total number of microservice required, as determined in the step 512 (e.g., the microservice Si is already running in the group). Thus, in the above-described example for S6, the SUF (S6)=4−1=3. In embodiments, if the SUF is determined to be less than or equal to zero, then the SUF is reset to 1. The adding of microservices based on the identified SUF is described in further detail below with reference to FIG. 5E.

FIG. 5D is a flowchart depicting operations of another method for performing dynamic scale-up of computer resources in a group according to an embodiment of the present disclosure. At a step 520, the resource allocation manager monitors and records the Total Invocation Cost associated with microservice call sequences (i.e., where a sequence comprises a series of microservice calls) made while processing requests submitted to the group over a predetermined period of time. For example, consider the group of microservices shown in FIG. 5B. A request may result in the following microservice call sequence: S3→S6→S2→S4. The Total Invocation Cost ($TIC_R$) associated with this request is $MIC_{36}$+$MIC_{62}$+$MIC_{24}$. The resource allocation manager records the $TIC_R$ of requests to the group over the predetermined period of time, with each request being associated with a microservice call sequence. For example, the $TIC_R$ associated with the path S3→S6→S2→S4 over several requests will be recorded by the resource allocation manager.

In embodiments, a value TIC_max represents a pre-configured value maintained by the resource allocation manager that represents a maximum total invocation cost that can be associated with any microservice call sequence. If a TIC value for a call sequence is higher than TIC_max, this indicates that the request is processed in a costly way. In a step 522, the resource allocation manager compares the TIC associated with each microservice call sequence determined in the step 520 to the TIC_max value. If it is determined in a step 524 that for a given microservice sequence, $TIC_R$<TIC_max, then no scale-up is performed for that microservice call sequence, as shown at the step 526. If for a given microservice sequence, $TIC_R$>TIC_max, then scale-up needs to be performed for that microservice call sequence. This is shown at the step 528.

When the resource allocation manager determines that scale-up is to be performed for a given microservice call sequence of a group, the resource allocation manager identifies each of the microservices involved in the given sequence. For each of the identified microservices, the resource allocation manager performs the following steps: (i) if Avg-$MIC_{Si}$>MIC_max, then the SUF is identified (e.g., according to the steps 510, 512 of FIG. 5A), (ii) if Avg-$MIC_{Si}$<MIC_min (e.g., where MIC_min represents the minimum MIC required to be a part of scale-up routine), then the microservice is ignored, (iii) if MIC_min<Avg-$MIC_{Si}$<MIC_max, then add the microservice to a scale up list, (iv) sort the scale up list in the descending order of MIC, (v) identify a pre-configured top "x" microservices for the scale-up process, and (vi) identify the SUF for each of the "x" microservices (e.g., according to the steps 510, 512 of FIG. 5A).

It is noted that if SUF is determined to be zero, then the SUF is reset to 1. For example, consider a microservice call sequence S3→S6→S2→S4 with Avg-$TIC_R$=106, where MIC_max=50, TIC_max=100, and MIC_min=5. Since $TIC_R$>TIC_max, scale up needs to be performed for this sequence. Assume that $MIC_{S3}$=40, $MIC_{S6}$=60, $MIC_{S2}$=4, and $MIC_{S4}$=2. In this example, S2 and S4 are not added to the scale up list since $MIC_{Si}$<MIC_min. For S6, Avg-$MIC_{Si}$>MIC_max, such that the SUF is identified (e.g., according to the steps 510, 512 of FIG. 5A). For S3, which is added to the scale-up list, Effective $MIC_{S3}$=40*1.2=48, and a number of services required=48/50=0.96=1. Accordingly, for S3, SUF=1−1=0. Thus, to handle this condition, the resource allocation manager resets the SUF equal to 1.

Figure 5E:
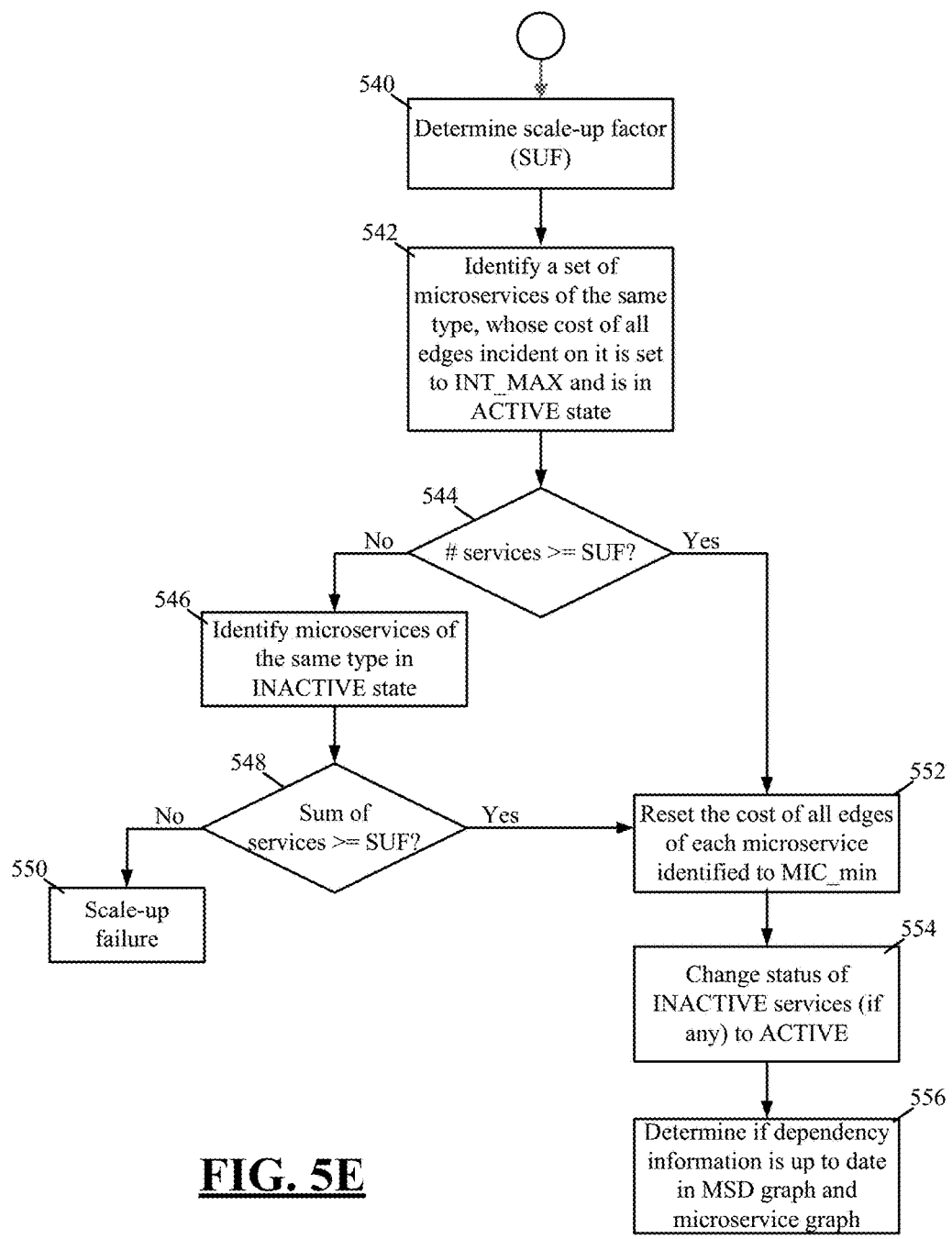
FIG. 5E is a flowchart depicting operations for activating computer resources of a group after determining a scale-up factor (SUF).

As noted above, example operations for adding microservices to a group based on the SUF value are illustrated in FIG. 5E. As shown in this figure, an SUF value is determined at a step 540. The determination of an SUF value is explained above with reference to FIGS. 5A and 5D. In a step 542, for each microservice identified, the resource allocation manager identifies a set of microservices of same microservice-type, whose cost of all edges incident on it is set to INT_MAX (i.e., maximum integer value possible) and is in ACTIVE state. At a step 544, the resource allocation manager determines whether the number of identified microservices is greater than or equal to the SUF. If the number of identified microservices is greater than or equal to the SUF, the method proceeds to a step 552, described below. If the number of identified microservices is not greater than or equal to the SUF, the method proceeds to a step 546.

In the step 546, the resource allocation manager identifies microservices of a same microservice-type, in the INACTIVE state. At a step 548, a determination is made as to whether a sum of the number of microservices identified in steps 542 and 546 is greater than or equal to the SUF. If the sum is greater than or equal to the SUF, then the method proceeds to the step 552, described below. If the sum is not greater than or equal to the SUF, then at a step 550, it is determined that scale-up failure has occurred. In embodiments, the resource allocation manager notifies the administrator about the scale-up failure. In embodiments, the determination that scale-up failure has occurred means that the resource allocation manager cannot meet the needed SUF by activating dormant computer resources (e.g., active microservices with INT_MAX edges, inactive microservices, etc.) of the group. When scale-up failure occurs, in embodiments, the resource allocation manager uses a migration procedure in order to "migrate" microservices from other groups into the group needing additional microservices. The migration procedure is described in greater detail below with reference to FIGS. 7A-7C.

In the step 552, the resource allocation manager resets the cost of all edges of each microservice identified to MIC_min. At a next step 554, the resource allocation manager changes the status of the identified INACTIVE microservices (if any) to ACTIVE. At a step 556, the resource allocation manager then ascertains that dependency information is up to date in both MSD graph and microservice graph. In this way, the resource allocation manager supports the scale up of microservices. In embodiments, the resource allocation manager does not launch new microservices in the group when scale-up is needed but rather manages the existing, unused (e.g., dormant) microservices of the group in an efficient way.

Figure 6:
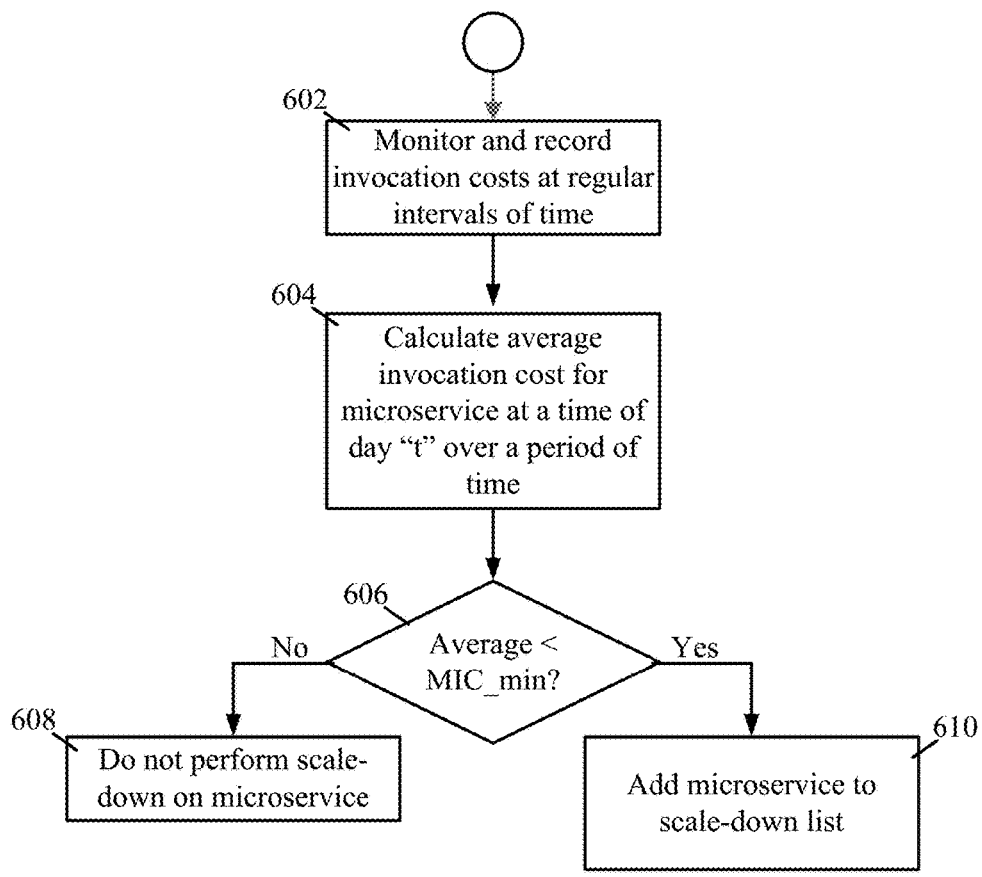
FIG. 6 is a flowchart depicting operations for performing dynamic scale-down of computer resources in a group according to an embodiment of the present disclosure.

FIG. 6 is a flowchart depicting operations for performing dynamic scale-down of computer resources in a group according to an embodiment of the present disclosure. The resource allocation manager supports dynamic scale down of microservices of a group during runtime. If a general load pattern in the group or multiple groups is very low, the resource allocation manager scales down microservices of the group by deactivating microservices of certain types in the group. In embodiments, the resource allocation manager achieves the scale-down of services within the group using the steps of the flowchart of FIG. 6.

At a step 602, the resource allocation manager monitors and records the $MIC_{Si}$ (i.e., invocation cost of microservice "i") of each microservice in the group during regular intervals of time. If there are multiple microservices invoking a given microservice, then the average value is identified. For example, consider the microservice graph shown in FIG. 5B. In order to calculate $MIC_{S6}$ at a given point of time, the resource allocation manager (i) determines the cost associated with each of the edges incident on S6, i.e., (S7, S6), (S5, S6) and (S3, S6), and (ii) determines the average of these costs. The average of these costs is $MIC_{S6}$ at that given point of time. In a step 604, the resource allocation manager calculates an average invocation cost Average $MIC_{Si}$ (i.e., Avg-$MIC_{Si}$) for each microservice of the group at a time of day "t" over a predetermined period of time (e.g., 7 days). In embodiments, the resource allocation manager does this by finding the ratio of the sum of MIC recorded over the period to the total number of samples/days considered. As an example, from the dataset shown in FIG. 5C, it can be seen that Avg-$MIC_{S1}$=10.29 (i.e., (10+11+8+9+12+13+9)/7 days).

In embodiments, a value MIC_min is a pre-configured value in the platform maintained by the resource allocation manager that indicates a minimum invocation cost that needs to be associated with a given microservice type. This can be configured for all microservices in the platform or on a per-microservice-type basis (e.g., separate configuration for each microservice type). If an MIC value is lesser than MIC_min, this indicates that the given microservice is relatively free or idle. At a step 606, the resource allocation manager compares the Avg-$MIC_{Si}$ of each microservice Si of the group with the MIC_min associated with the microservice type of Si. If for a given microservice Si, Avg-$MIC_{Si}$>MIC_min, then at a step 608, it is determined that scale-down should not be performed on the microservice in the group. Accordingly, in embodiments, no operation is performed on that microservice.

If for a given microservice Si, Avg-$MIC_{Si}$<MIC_min, then at a step 610, the microservice Si is added to a scale-down list. In embodiments, a value "minimum-microservice-counttype" represents a minimum number of microservices of a given microservice-type that should be in ACTIVE state in a given group. For each microservice present in the scale down list, the resource allocation manager performs the following. If the number of active microservices of the given microservice's type is greater than minimum-microservice-counttype, then the resource allocation manager increases the cost of all edges incident on the microservice to INT_MAX (i.e., maximum integer value possible). This will ensure that the Total Cost of any service call sequence involving this node will be very high (>=INT_MAX) and thus any subsequent service call path including this microservice will not be considered as a candidate path for servicing a request. Thus, no new requests will be delegated to this microservice. If the number of active microservices of the given microservice's type is less than or equal to minimum-microservice-counttype, then no operation will be performed. In the next step, the resource allocation manager identifies the microservices from the list which have been idle for a pre-configured period a time and changes the status to INACTIVE. When the status of a microservice is INACTIVE, it does not service any requests. The inactive microservice also relinquishes resources (e.g., file handlers, locks, database connections etc.), it has for processing requests.

Figure 7A:
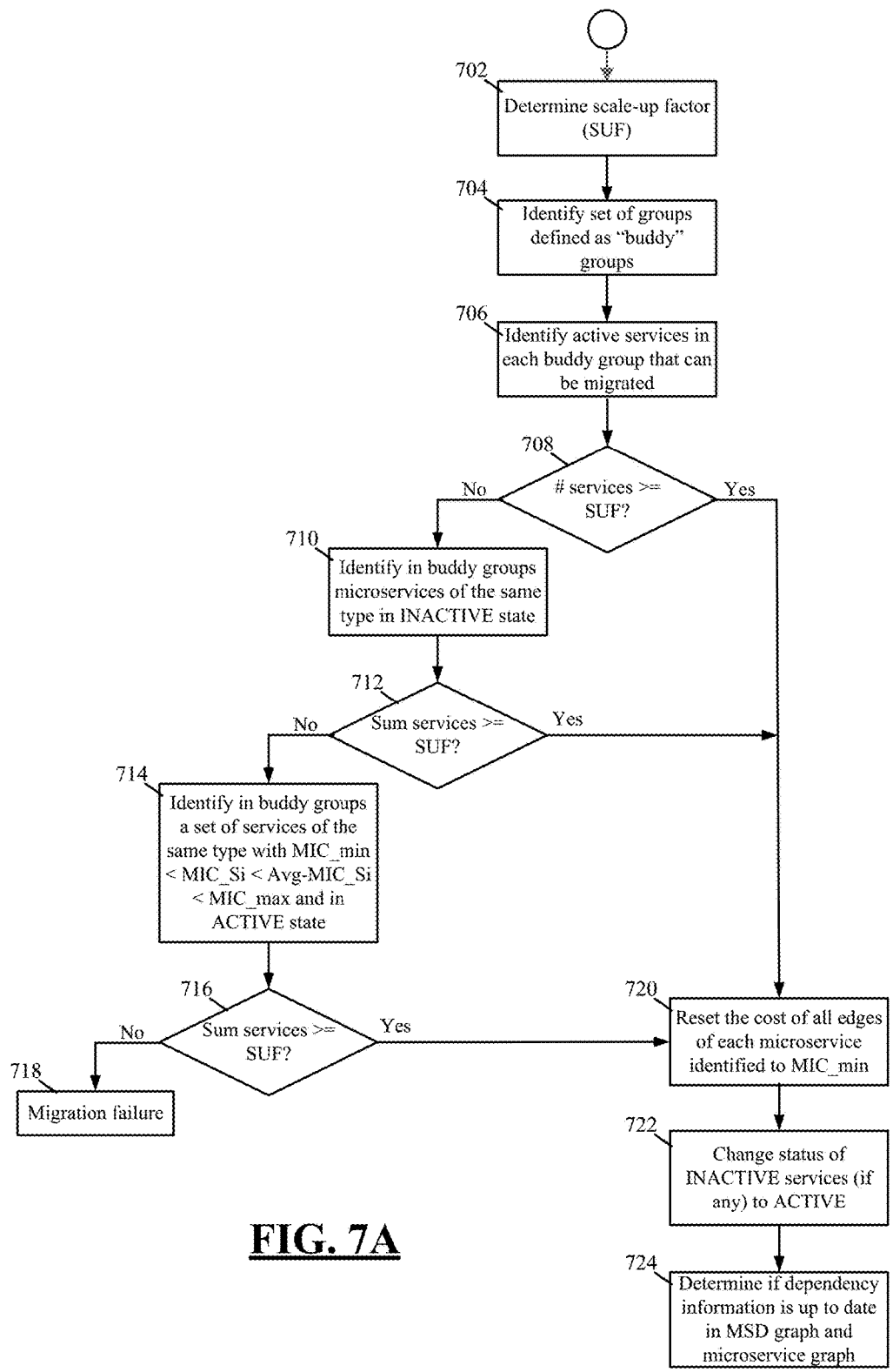
FIG. 7A is a flowchart depicting operations for migrating computer resources from one group to another according to an embodiment of the present disclosure.

FIG. 7A is a flowchart depicting operations for migrating computer resources from one group to another according to an embodiment of the present disclosure. The resource allocation manager supports migration of microservices from one group to another. In embodiments, migration of microservices from one group to another is performed when scale-up of microservices within a group fails (e.g., when an SUF cannot be met by activating unused microservices within the group). To enable migration of microservices from one group to another, the resource allocation manager associates each microservice group with a set of "buddy groups." The buddy groups comprise the set of groups from which a given microservice group is open for migration. For example, if there are multiple groups assigned to a tenant, in embodiments, the resource allocation manager configures these groups as being buddy groups of one another, such that microservices may be migrated between the groups.

At a step 702, the resource allocation manager determines an SUF value. The determination of the SUF value is described above with reference to FIGS. 5A and 5D. In a step 704, for each microservice identified, the resource allocation manager identifies the set of groups defined as buddy groups to the current microservice group. In a step 706, from each of the buddy groups identified, the resource allocation manager identifies a set of microservices of same microservice-type, whose cost of all edges incident on it is set to INT_MAX (Maximum integer value possible) and is in ACTIVE state. The resource allocation manager also ascertains at the step 706 that the number of active microservices of same microservice type in such buddy groups will be still greater than minimum-microservice-counttype, even after the identified microservices are migrated to a different group.

At a step 708, the resource allocation manager compares the number of microservices identified to the SUF. If the number is greater than or equal to the SUF, then the method proceeds to a step 720, described in further detail below. If the number is not greater than or equal to the SUF, then the method proceeds to a step 710. At the step 710, from each of the buddy groups identified, the resource allocation manager identifies microservices of same microservice-type, in INACTIVE state. At a step 712, the resource allocation manager compares the sum of the number of microservices identified in the steps 706, 710 to the SUF. If the sum is greater than or equal to the SUF, then the method proceeds to the step 720, described in further detail below. If the sum is not greater than or equal to the SUF, then the method proceeds to the step 714.

At the step 714, from each of the buddy groups identified, the resource allocation manager identifies a set of microservices of the same microservice-type, with MIC_min<$MIC_{Si}$ (current MIC of Si)<Avg-$MIC_{Si}$<MIC_max and is in ACTIVE state. The resource allocation manager also ascertains that the number of active microservices of the same microservice type in such buddy groups will be still greater than minimum-microservice-counttype, even after the identified microservices are migrated to a different group. At a step 716, the resource allocation manager compares the sum of the number of microservices identified in the steps 706, 710, 714 to the SUF. If the sum is greater than or equal to the SUF, then the method proceeds to the step 720, described below. If the sum is not greater than or equal to the SUF, then it is determined at the step 718 that migration failure has occurred.

At the step 720, the resource allocation manager resets the cost of all edges of each microservice identified to MIC_min. At a step 722, the resource allocation manager changes the status of the identified INACTIVE microservices (if any) to ACTIVE. The resource allocation manager then updates the groupId of the migrated microservices with the groupId of the current microservice's group. At a step 724, the resource allocation manager ascertains that dependency information is up to date in both the MSD graph and the microservice graph associated with the current group and buddy group(s).

Figure 7B:
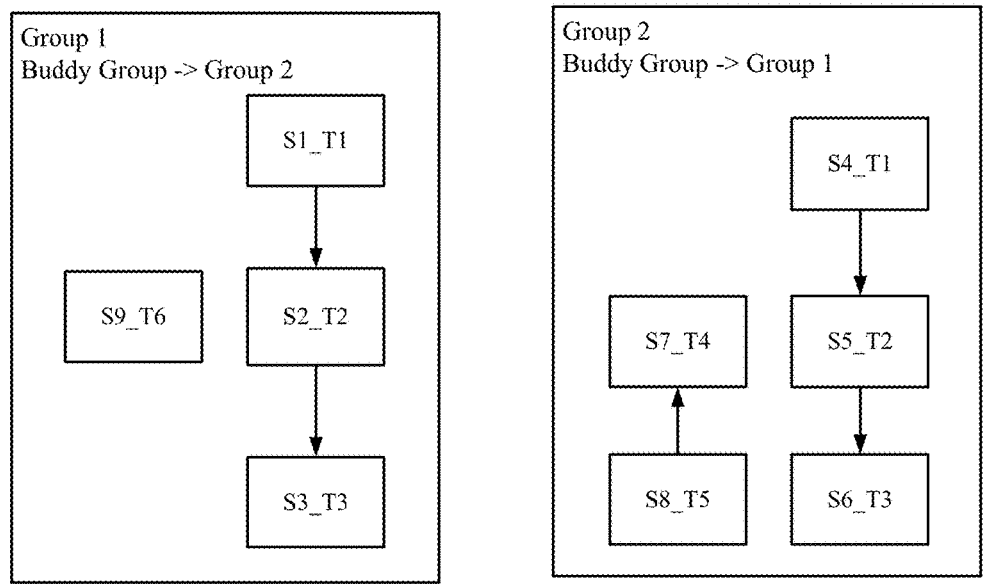
FIGS. 7B and 7C illustrate an example migration of computer resources from one group to another, according to an embodiment of the present disclosure.
Figure 7C:
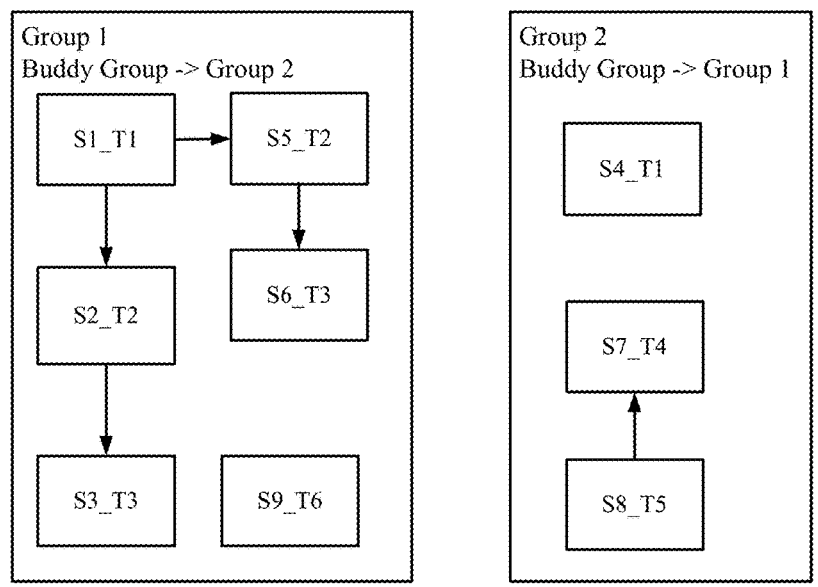

FIGS. 7B and 7C illustrate an example migration of computer resources from one group to another, according to an embodiment of the present disclosure. FIG. 7B depicts first and second groups of computer resources prior to a migration process implemented by the resource allocation manager. In the example of FIGS. 7B and 7C, the computer resources comprise software modules, such as the microservices described herein. The first group is a buddy group of the second group, and vice versa. FIG. 7C depicts the first and second groups of computer resources after the migration process. As shown in the figures, computer resources have been migrated from the second group to the first group.

The resource allocation manager supports fault tolerance by performing both fault avoidance and fault remediation. The platform may face various conditions that necessitate fault avoidance and/or remediation. For example, one or more of the dependent microservices in a microservice call sequence is unavailable and gets identified before making the initiating the microservice call. As another example, the identified microservice call sequence for servicing of the current request has $TIC_{CURRENT}$ such that ($TIC_{MIN}<TIC_{CURRENT}$) && ($TIC_{CURRENT}>>TIC_{AVG}$) && ($TIC_{CURRENT}\sim=TIC_{MAX}$). As another example, a temporary disconnection of one or more of the dependent microservices occurs while the request is being serviced.

In embodiments, the resource allocation manager makes use of the MSD graph to identify whether a request to a given microservice can be processed or not by identifying all the dependent microservices of the current microservice and checking whether they are in ACTIVE state. If there are no such paths available in the current group, then, in a next step, from each of the buddy groups identified, the resource allocation manager identifies a microservice call sequence in which all the dependent services are in ACTIVE state. If such a microservice call sequence is identified, the resource allocation manager re-routes the microservice invocation request to the group associated with the microservice call sequence.

Likewise, in the second condition noted above, when the identified microservice call sequence for servicing the current request has a very high $TIC_{CURRENT}$ (although within agreed limit $TIC_{MAX}$), then the resource allocation manager attempts to find an alternate microservice call sequence with a lower TIC. If there are no such paths available in the current group, then, in a next step, from each of the buddy groups identified, the resource allocation manager identifies a microservice call sequence in which all the dependent services are in the ACTIVE state and the sequence's TIC is less than $TIC_{CURRENT}$. If such a microservice call sequence is identified, the resource allocation manager re-routes the microservice invocation request to the group associated with the microservice call sequence.

In the third condition noted above (e.g., a temporary disconnection of one or more of the dependent microservices while the request is being serviced), it is not possible to restart the request, as it has already been serviced by one or more of the dependent microservices in the microservice call sequence. Thus, the only viable option may be to re-route the request being processed to a different microservice (of the same type) in the same group or a different group. For example, consider the sequence S1→S2→S3→S4→S5. The request starts to get processed by S1, followed by S2 and S3, but right after the invocation is made to S4, S4 gets disconnected. S3 may not receive any response. In this case, the resource allocation manager waits for a configured period of time (time-out) and if the resource allocation manager doesn't receive any response, the resource allocation manager searches for an identical microservice call path in the microservice graph associated with the current group. If not found, the resource allocation manager searches for an identical microservice call path in the microservice graph associated with the buddy groups associated with the current group. If such a path is identified, and if all required dependent services (here S3, S4 and S5) are in ACTIVE state, then the resource allocation manager re-routes the microservice invocation request to the group associated with the microservice call sequence.

The resource allocation manager supports parallel processing of sub-requests in a request by assigning the sub-requests to multiple microservice call sequence paths. This is desirable for microservices with CPU-intense operations like number crunching services. In embodiments, the resource allocation manager achieves parallel processing as follows. The microservice(s) that intend to parallelize the processing of sub-requests indicate themselves as being Parallelizable. This is done by implementing the framework interface, IParallelizable. This interface lets the microservices implement the method (1) processRequest(Request), where the Request object represents the incoming request and is comprised of multiple SubRequest objects (each representing a sub-request), and (2) processSubRequest (SubRequest), where the SubRequest object represents a sub-request associated with the Request.

Whenever a microservice call is being made, the resource allocation manager checks whether the microservice has been marked as parallelizable or not. If it is not marked as parallelizable, distributed processing ends. If it is marked as parallelizable, then the resource allocation manager checks whether processRequest( ) is being called. If processRequest( ) is being called, then the resource allocation manager identifies the Request and the SubRequests associated with that Request. In a next step, the resource allocation manager identifies the microservice call sequence associated with the request in the MSD graph. Next, the resource allocation manager searches for an identical microservice call path in the microservice graph associated with the current group. If not found, the resource allocation manager searches for an identical microservice call path in the microservice graph associated with the buddy groups associated with the current group.

If no microservice call path is found, then the current request cannot be serviced. An administrator is notified about the request processing failure. In a next step, when multiple such paths are found, the resource allocation manager identifies the Avg-TIC associated with each microservice call sequence identified. The set of microservice call sequences identified are then sorted in an ascending order on the basis of Avg-TIC. For each SubRequest associated with the Request, the resource allocation manager performs the following. First, the resource allocation manager identifies the next microservice call sequence from the sorted list and assigns the SubRequest to it. The resource allocation manager then invokes the processSubRequest(SubRequest) method defined in the microservice to process the SubRequest. The resource allocation manager repeats the above steps until all SubRequests associated with the Request are assigned to one of the microservice call sequences in the sorted list.

If the functions exposed by a microservice are no longer required, the resource allocation manager terminates the microservice, to alleviate the load on servers and to free up resources. The resource allocation manager identifies the microservice graph associated with the group to which the current microservice (the one to be terminated) belongs to. The resource allocation manager then searches for the current microservice in the microservice graph. Next, the resource allocation manager increases the cost of all edges incident on the current microservice to INT_MAX (Maximum integer value possible). This will make sure that a Total Cost of any service call sequence involving this node will be very high (>=INT_MAX) and thus any subsequent service call path including this node will not be considered as a candidate path for servicing a request. Thus, no new requests will be delegated to this micorservice. Next, the resource allocation manager checks the number of active requests associated with the current microservice. If the number of active requests is zero, then the resource allocation manager terminates the service immediately. If the number of active requests is greater than zero, then the resource allocation manager waits for a pre-configured amount of time.

In a next step, after a pre-configured period of time, the resource allocation manager again checks for the number of active requests, and if it is zero, the resource allocation manager terminates the microservice immediately. If the number of active requests is still greater than zero, then the resource allocation manager sends a notification message to the source of the termination request (or administrator of the platform). If there is no response to the message sent above from the source or if the response is to go ahead with the termination, the resource allocation manager updates the status of the microservice in the microservice graph to TERMINATED. Next, the resource allocation manager terminates the microservice immediately. If the response from the source is to cancel the termination request, the resource allocation manager resets the cost of all edges incident on the current microservice back to its previous value. The resource allocation manager thus retains the microservice, instead of terminating it.

Figure 8:
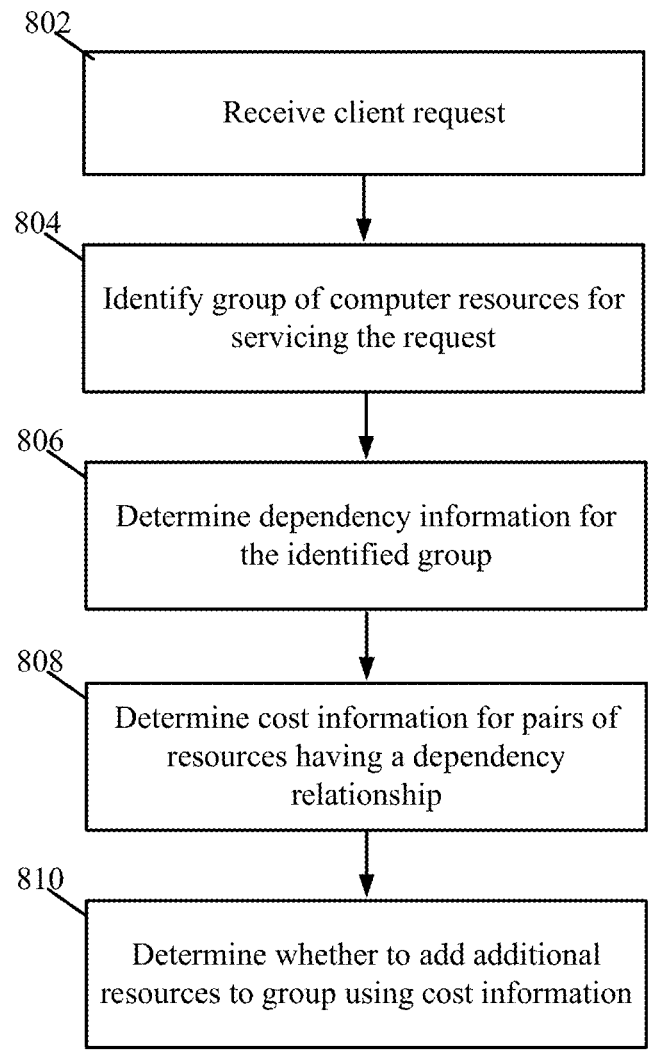
FIG. 8 is a flowchart depicting steps of an example method of processing a request from a client according to an embodiment of the present disclosure.

FIG. 8 is a flowchart depicting steps of an example method of processing a request from a client according to an embodiment of the present disclosure. At 802, a request for a computer-implemented process to be performed is received from a client. At 804, a group of computer resources responsible for performing the computer-implemented process is identified. At 806, dependency information indicating dependency relationships between pairs of computer resources of the identified group is determined. At 808, for pairs of computer resources determined to have a dependency relationship, a cost incurred when a first computer resource of the pair invokes a second computer resource of the pair is determined at multiple points in time. At 810, it is determined whether to add additional computer resources to the group based on the cost information.

Figure 9A:
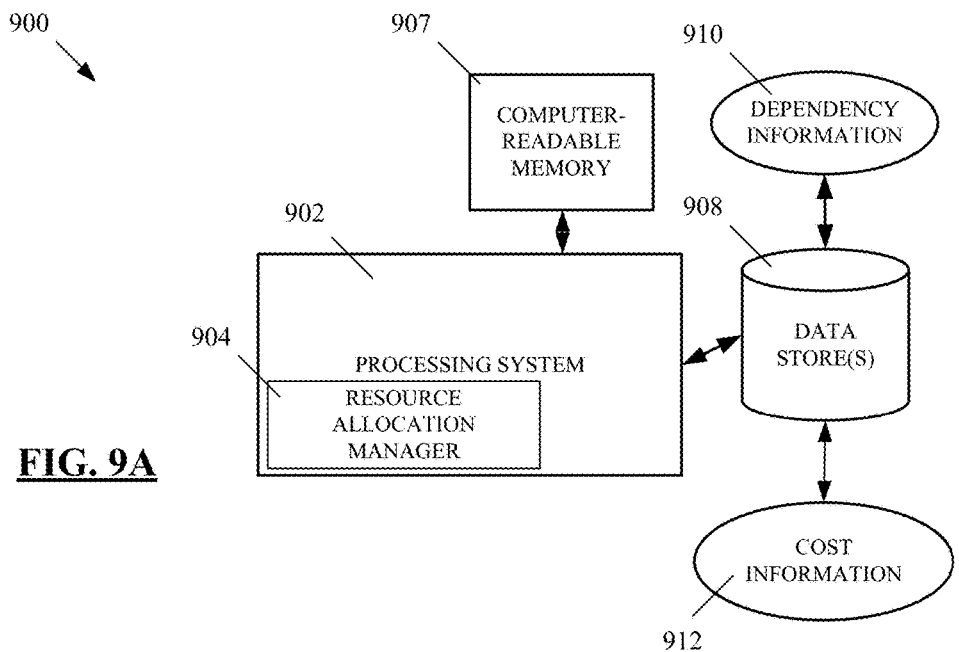
FIGS. 9A, 9B, and 9C depict example systems for implementing the techniques described herein for managing computer resources.
Figure 9B:
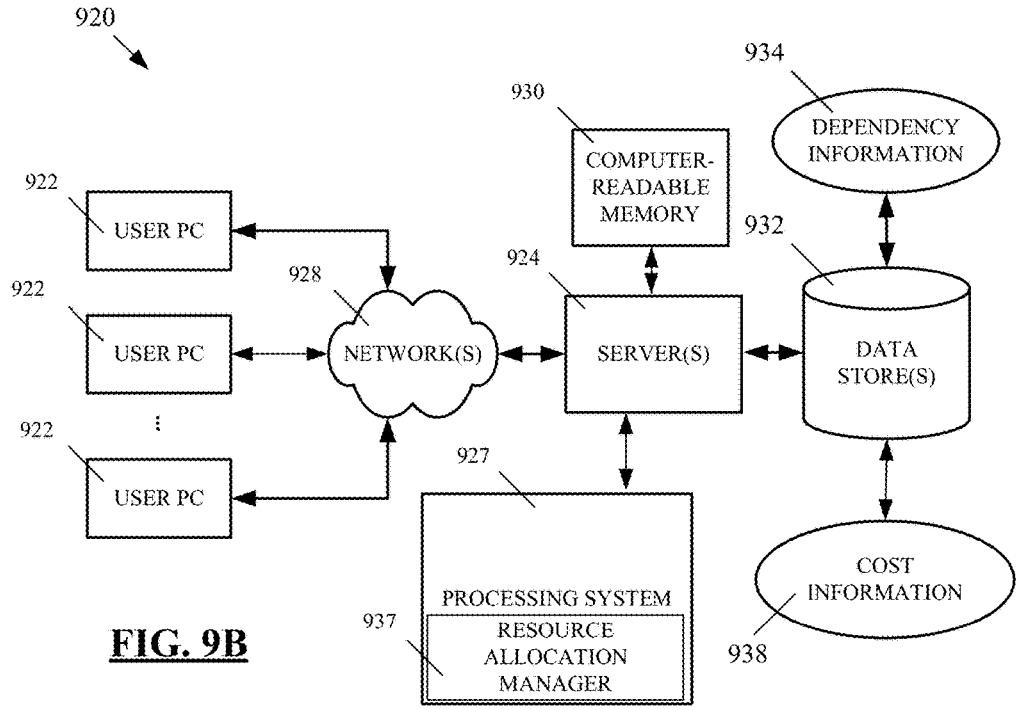
Figure 9C:
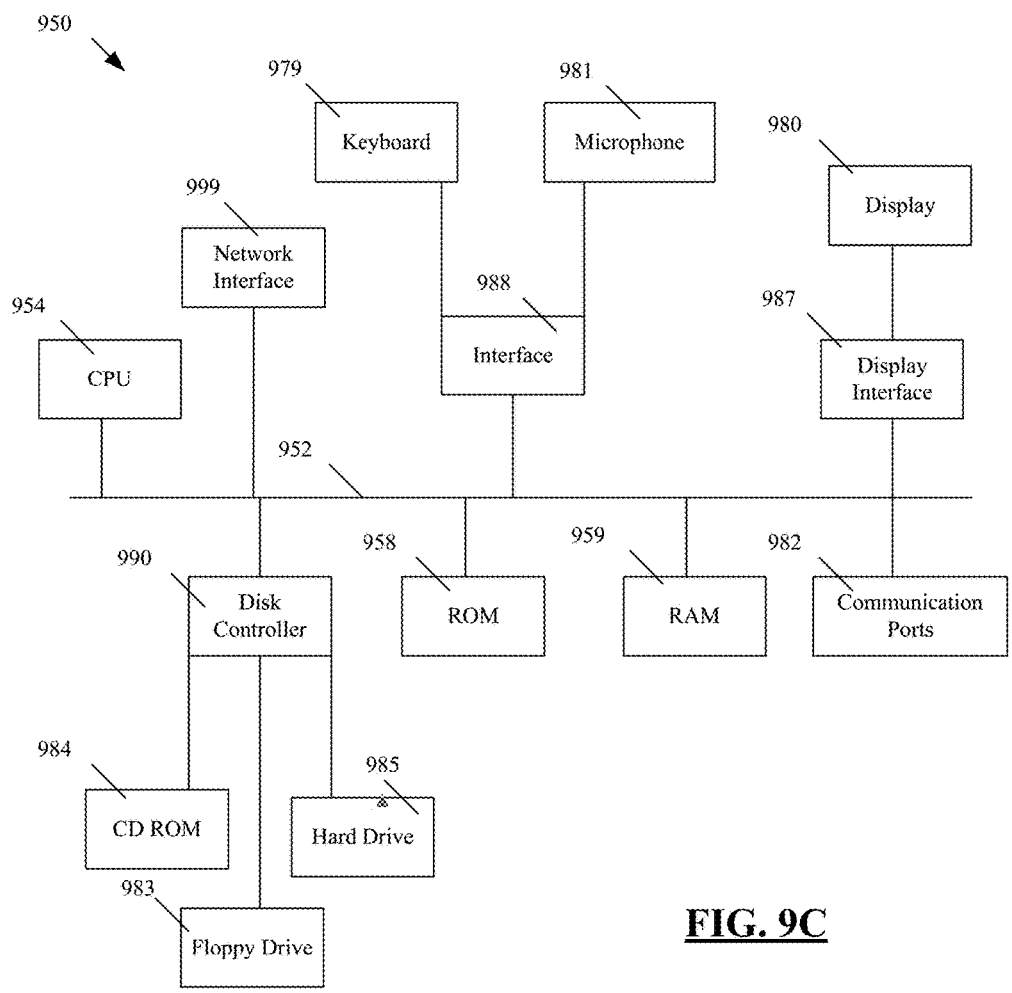

FIGS. 9A, 9B, and 9C depict example systems for implementing the techniques described herein for managing computer resources. For example, FIG. 9A depicts an exemplary system 900 that includes a standalone computer architecture where a processing system 902 (e.g., one or more computer processors located in a given computer or in multiple computers that may be separate and distinct from one another) includes a resource allocation manager 904 being executed on the processing system 902. The processing system 902 has access to a computer-readable memory 907 in addition to one or more data stores 908. The one or more data stores 908 may include dependency information 910 as well as cost information 912. The processing system 902 may be a distributed parallel computing environment, which may be used to handle very large-scale data sets.

FIG. 9B depicts a system 920 that includes a client-server architecture. One or more user PCs 922 access one or more servers 924 running a resource allocation manager 937 on a processing system 927 via one or more networks 928. The one or more servers 924 may access a computer-readable memory 930 as well as one or more data stores 932. The one or more data stores 932 may include dependency information 934 as well as cost information 938.

FIG. 9C shows a block diagram of exemplary hardware for a standalone computer architecture 950, such as the architecture depicted in FIG. 9A that may be used to include and/or implement the program instructions of system embodiments of the present disclosure. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 958 and random access memory (RAM) 959, may be in communication with the processing system 954 and may include one or more programming instructions for performing methods (e.g., algorithms) for managing computer resources. Optionally, program instructions may be stored on a non-transitory computer-readable storage medium such as a magnetic disk, optical disk, recordable memory device, flash memory, or other physical storage medium.

In FIGS. 9A, 9B, and 9C, computer readable memories 907, 930, 958, 959 or data stores 908, 932, 983, 984 may include one or more data structures for storing and associating various data used in the example systems for managing computer resources. For example, a data structure stored in any of the aforementioned locations may be used to store data relating to dependency information, cost information, and/or data for other variables described herein. A disk controller 990 interfaces one or more optional disk drives to the system bus 952. These disk drives may be external or internal floppy disk drives such as 983, external or internal CD-ROM, CD-R, CD-RW or DVD drives such as 984, or external or internal hard drives 985. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 990, the ROM 958 and/or the RAM 959. The processor 954 may access one or more components as required.

A display interface 987 may permit information from the bus 952 to be displayed on a display 980 in audio, graphic, or alphanumeric format. Communication with external devices may optionally occur using various communication ports 982.

In addition to these computer-type components, the hardware may also include data input devices, such as a keyboard 979, or other input device 981, such as a microphone, remote control, pointer, mouse and/or joystick. Such data input devices communicate with the standalone computer architecture 950 via an interface 988, in some embodiments. The standalone computer architecture 950 further includes a network interface 999 that enables the architecture 950 to connect to a network, such as a network of the one or more networks 928.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features dis-

What is claimed is:

1. A computer-implemented method for processing a request from a client, the method comprising:
receiving from a client a request for a computer-implemented process to be performed, the computer-implemented process requiring at least one microservice for performing a specified database function and/or generating a report in response to a database request;
identifying a group of computer resources responsible for performing the computer-implemented process;
determining, using a microservice dependency graph, dependency information indicating dependency relationships between pairs of computer resources of the identified group;
for pairs of computer resources determined to have a dependency relationship, determining at multiple points in time cost information indicating a cost incurred when a first computer resource of the pair invokes a second computer resource of the pair;
determining whether to add additional computer resources to the group based on the cost information; and
executing the requested computer-implemented process using the additional computer resources when it is determined to add such additional computer resources;
wherein:
a resource manager monitors invocations of microservices and either dynamically updates an existing microservice dependency graph with nodes reflecting an invocation of a microservice or generates a new microservice dependency graph with nodes reflecting an invocation of a microservice if a microservice dependency graph does not exist;
the determining of whether to add additional computer resources to the group based on the cost information comprises:
using the cost information to calculate an average cost of invoking a given computer resource at a time of day over a predetermined period of time;
comparing the calculated average to a threshold value;
based on a determination that the average is not greater than the threshold value, determining that the additional computer resources are not to be added to the group; and
based on a determination that the average is greater than or equal to the threshold value, determining that the additional computer resources are to be added to the group.

2. The computer-implemented method of claim 1, further comprising: allocating the additional computer resources to the group when it is determined that the additional computer resources are to be added to the group.

3. The computer-implemented method of claim 1, wherein when it is determined that additional computer resources are to be added to the group, the method further comprises: determining a number of additional computer resources to be added to the group; determining whether the number can be met by activating unused computer resources of the group; and based on a determination that the number cannot be met by activating unused computer resources, identifying computer resources of another group of resources to be added to the identified group of resources.

4. The computer-implemented method of claim 1, further comprising: determining whether to deactivate computer resources of the group based on the cost information.

5. The computer-implemented method of claim 1, wherein in the determining of whether to add the additional computer resources to the group, the cost information comprises historical cost information determined during a predetermined period of time in the past.

6. The computer-implemented method of claim 1, wherein the determining of the cost information comprises: calculating the cost information based on a computer-implemented process that utilizes calculated weights for multiple cost variables, the cost variables comprising (i) a first variable based on a current number of requests being serviced by a given computer resource, and (ii) a second variable based on an average amount of time required for the given computer resource to service a request.

7. A computer-implemented system for processing a request from a client, the system comprising:
a processing system including at least one programmable data processor; and
computer-readable memory in communication with the processing system encoded with instructions for commanding the processing system to execute steps comprising:
receiving from a client a request for a computer-implemented process to be performed, the computer-implemented process requiring at least one microservice for performing a specified database function and/or generating a report in response to a database request;
identifying a group of computer resources responsible for performing the computer-implemented process;
determining, using a microservice dependency graph, dependency information indicating dependency relationships between pairs of computer resources of the identified group;
for pairs of computer resources determined to have a dependency relationship, determining at multiple points in time cost information indicating a cost incurred when a first computer resource of the pair invokes a second computer resource of the pair;
determining whether to add additional computer resources to the group based on the cost information; and
executing the requested computer-implemented process using the additional computer resources when it is determined to add such additional computer resources;
wherein:
a resource manager monitors invocations of microservices and either dynamically updates an existing microservice dependency graph with nodes reflecting an invocation of a microservice or generates a new microservice dependency graph with nodes reflecting an invocation of a microservice if a microservice dependency graph does not exist;
the determining of whether to add additional computer resources to the group based on the cost information comprises:
using the cost information to calculate an average cost of invoking a given computer resource at a time of day over a predetermined period of time;
comparing the calculated average to a threshold value;

based on a determination that the average is not greater than the threshold value, determining that the additional computer resources are not to be added to the group; and based on a determination that the average is greater than or equal to the threshold value, determining that the additional computer resources are to be added to the group.

8. The computer-implemented system of claim 7, wherein the steps executed by the processing system further comprise: allocating the additional computer resources to the group when it is determined that the additional computer resources are to be added to the group.

9. The computer-implemented system of claim 7, wherein the steps further comprise: determining whether to deactivate computer resources of the group based on the cost information.

10. The computer-implemented system of claim 7, wherein when it is determined that additional computer resources are to be added to the group, the steps further comprise: determining a number of additional computer resources to be added to the group; determining whether the number can be met by activating unused computer resources of the group; and based on a determination that the number cannot be met by activating unused computer resources, identifying computer resources of another group of resources to be added to the identified group of resources.

11. The computer-implemented system of claim 7, wherein in the determining of whether to add the additional computer resources to the group, the cost information comprises historical cost information determined during a predetermined period of time in the past.

12. The computer-implemented system of claim 7, wherein the determining of the cost information comprises: calculating the cost information based on a computer-implemented process that utilizes calculated weights for multiple cost variables, the cost variables comprising (i) a first variable based on a current number of requests being serviced by a given computer resource, and (ii) a second variable based on an average amount of time required for the given computer resource to service a request.

13. A non-transitory computer-readable storage medium for processing a request from a client, the computer-readable storage medium comprising computer executable instructions which, when executed, cause a processing system including at least one programmable data processor to execute steps including:

receiving from a client a request for a computer-implemented process to be performed, the computer-implemented process requiring at least one microservice for performing a specified database function and/or generating a report in response to a database request;

identifying a group of computer resources responsible for performing the computer-implemented process;

determining, using a microservice dependency graph, dependency information indicating dependency relationships between pairs of computer resources of the identified group;

for pairs of computer resources determined to have a dependency relationship, determining at multiple points in time cost information indicating a cost incurred when a first computer resource of the pair invokes a second computer resource of the pair;

determining whether to add additional computer resources to the group based on the cost information; and executing the requested computer-implemented process using the additional computer resources when it is determined to add such additional computer resources;

wherein:

a resource manager monitors invocations of microservices and either dynamically updates an existing microservice dependency graph with nodes reflecting an invocation of a microservice or generates a new microservice dependency graph with nodes reflecting an invocation of a microservice if a microservice dependency graph does not exist;

the determining of whether to add additional computer resources to the group based on the cost information comprises:

using the cost information to calculate an average cost of invoking a given computer resource at a time of day over a predetermined period of time;

comparing the calculated average to a threshold value;

based on a determination that the average is not greater than the threshold value, determining that the additional computer resources are not to be added to the group; and based on a determination that the average is greater than or equal to the threshold value, determining that the additional computer resources are to be added to the group.

14. The non-transitory computer-readable storage medium of claim 13, wherein the steps executed by the processing system further comprise: allocating the additional computer resources to the group when it is determined that the additional computer resources are to be added to the group.

15. The non-transitory computer-readable storage medium of claim 13, wherein the steps further comprise: determining whether to deactivate computer resources of the group based on the cost information.

16. The non-transitory computer-readable storage medium of claim 13, wherein when it is determined that additional computer resources are to be added to the group, the steps further comprise: determining a number of additional computer resources to be added to the group; determining whether the number can be met by activating unused computer resources of the group; and based on a determination that the number cannot be met by activating unused computer resources, identifying computer resources of another group of resources to be added to the identified group of resources.

17. The non-transitory computer-readable storage medium of claim 13, wherein in the determining of whether to add the additional computer resources to the group, the cost information comprises historical cost information determined during a predetermined period of time in the past.

18. The non-transitory computer-readable storage medium of claim 13, wherein the determining of the cost information comprises: calculating the cost information based on a computer-implemented process that utilizes calculated weights for multiple cost variables, the cost variables comprising (i) a first variable based on a current number of requests being serviced by a given computer resource, and (ii) a second variable based on an average amount of time required for the given computer resource to service a request.

* * * * *